(12) United States Patent
Ando

(10) Patent No.: US 8,321,082 B2
(45) Date of Patent: Nov. 27, 2012

(54) HYBRID VEHICLE

(75) Inventor: Yasushi Ando, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/231,662

(22) Filed: Sep. 13, 2011

(65) Prior Publication Data
US 2012/0072062 A1 Mar. 22, 2012

(30) Foreign Application Priority Data
Sep. 17, 2010 (JP) .................................. 2010-209811

(51) Int. Cl.
*G06F 17/00* (2006.01)
(52) U.S. Cl. ....... 701/22; 701/29.1; 701/29.3; 701/33.1; 701/31.4; 701/32.6; 208/113; 208/1; 208/164; 422/144; 422/171; 422/174; 422/177; 422/179; 502/42; 502/339; 502/347; 502/439; 528/141; 528/422; 528/408; 60/285; 60/299; 60/300; 562/416; 562/417; 562/487; 423/213.2; 423/239.1
(58) Field of Classification Search ............... 701/22, 701/29.1, 29.3, 33.1, 31.4, 31.6; 208/113, 208/120.01, 164; 422/144, 171, 174, 177, 422/179, 180; 502/42, 339, 347, 439; 528/141, 528/242, 408; 562/416, 417, 487; 60/285, 60/299, 300; 423/213.2, 239.1; 164/16; 526/151
See application file for complete search history.

(56) References Cited

U.S. PATENT DOCUMENTS

| | | | | |
|---|---|---|---|---|
| 7,624,568 B2 * | 12/2009 | Ando et al. | ...................... | 60/277 |
| 7,814,743 B2 * | 10/2010 | Inoue et al. | ...................... | 60/284 |
| 7,933,711 B1 * | 4/2011 | Ulrey et al. | ................... | 701/112 |
| 7,934,370 B2 * | 5/2011 | Ando et al. | ...................... | 60/285 |
| 7,971,668 B2 * | 7/2011 | Ando et al. | .............. | 180/65.265 |
| 7,997,365 B2 * | 8/2011 | Muta | .......................... | 180/65.28 |
| 8,131,453 B2 * | 3/2012 | Ulrey et al. | ................... | 701/112 |
| 2006/0168944 A1 * | 8/2006 | Inoue et al. | ...................... | 60/284 |
| 2006/0266323 A1 * | 11/2006 | Ogimura | ................... | 123/198 A |
| 2007/0163234 A1 * | 7/2007 | Ando et al. | ...................... | 60/277 |
| 2007/0163235 A1 * | 7/2007 | Ando et al. | ...................... | 60/277 |
| 2008/0110684 A1 * | 5/2008 | Kaita | ........................... | 180/65.2 |

(Continued)

FOREIGN PATENT DOCUMENTS

JP 2005147082 A 6/2005

(Continued)

*Primary Examiner* — James P Trammell
*Assistant Examiner* — McDieunel Marc
(74) *Attorney, Agent, or Firm* — Gifford, Krass, Sprinkle, Anderson & Citkowski, P.C.

(57) ABSTRACT

In a hybrid vehicle, control is executed to operate an engine with fuel injection being performed, when an unexecuted percentage of catalyst degradation suppression control is equal to or greater than a threshold value of the unexecuted percentage, when a power storage percentage of a battery is equal to or greater than a threshold value of the power storage percentage and the battery is charging, and also when a vehicle speed is equal to or greater than a threshold value of the vehicle speed and a cumulative air amount is equal to or greater than a threshold value of the cumulative air amount, when a catalyst temperature is less than a first threshold temperature and equal to or greater than a second threshold temperature, when the catalyst temperature is equal to or greater than the first threshold temperature, when there is a braking request while the engine is operating.

23 Claims, 8 Drawing Sheets

U.S. PATENT DOCUMENTS

| | | | |
|---|---|---|---|
| 2009/0008165 A1* | 1/2009 | Muta | 180/65.2 |
| 2009/0159351 A1* | 6/2009 | Ando et al. | 180/65.265 |
| 2010/0256849 A1* | 10/2010 | Akimoto | 701/22 |
| 2011/0192374 A1* | 8/2011 | Ulrey et al. | 123/319 |
| 2011/0307132 A1* | 12/2011 | Hashimoto | 701/22 |
| 2012/0022769 A1* | 1/2012 | Nakagawa et al. | 701/103 |
| 2012/0072062 A1* | 3/2012 | Ando | 701/22 |

FOREIGN PATENT DOCUMENTS

| | | |
|---|---|---|
| JP | 2006-070891 A | 3/2006 |
| JP | 2006-299826 A | 11/2006 |
| JP | 2007-192113 A | 8/2007 |
| JP | 2009-262677 A | 11/2009 |

\* cited by examiner

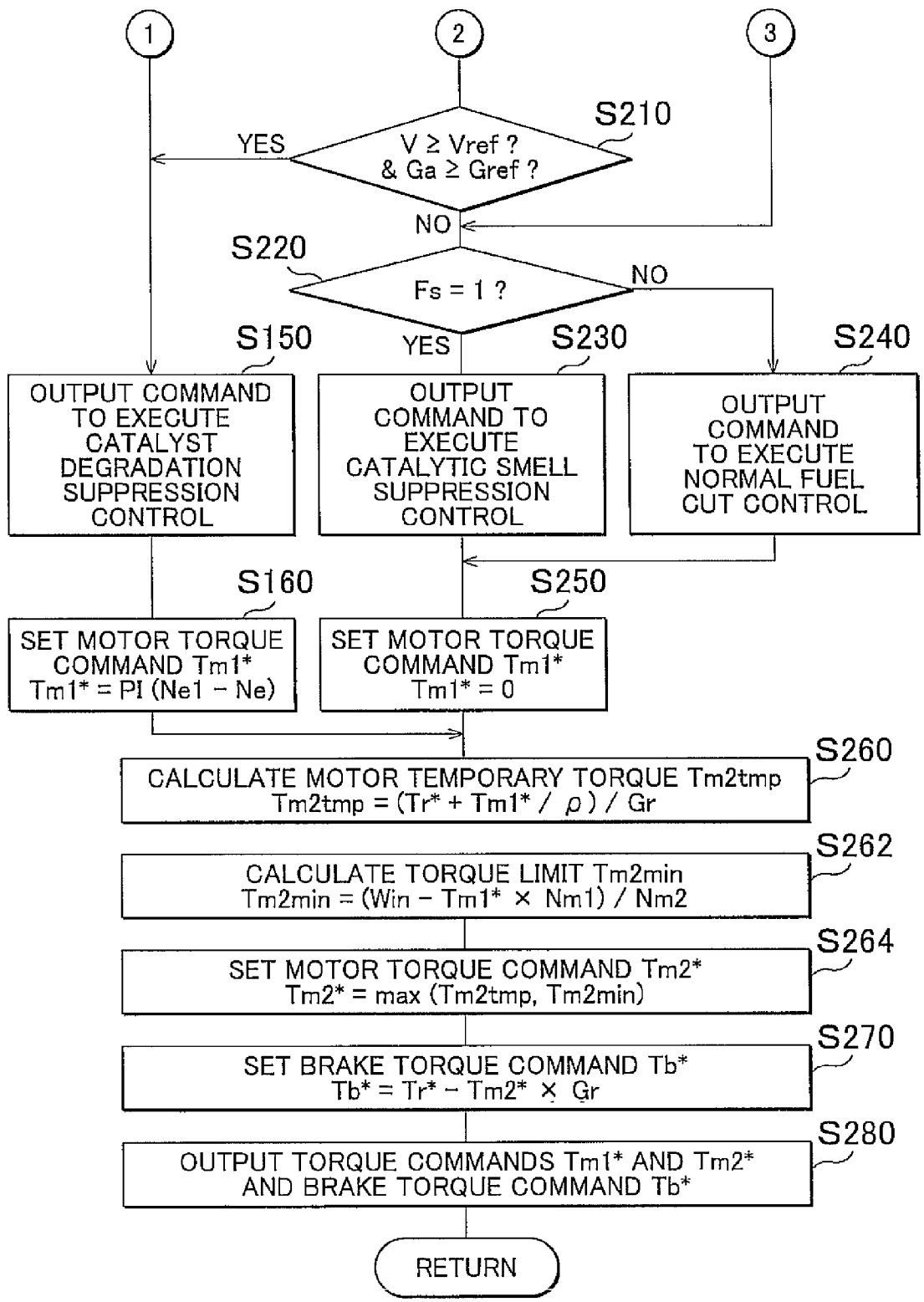

F I G . 9
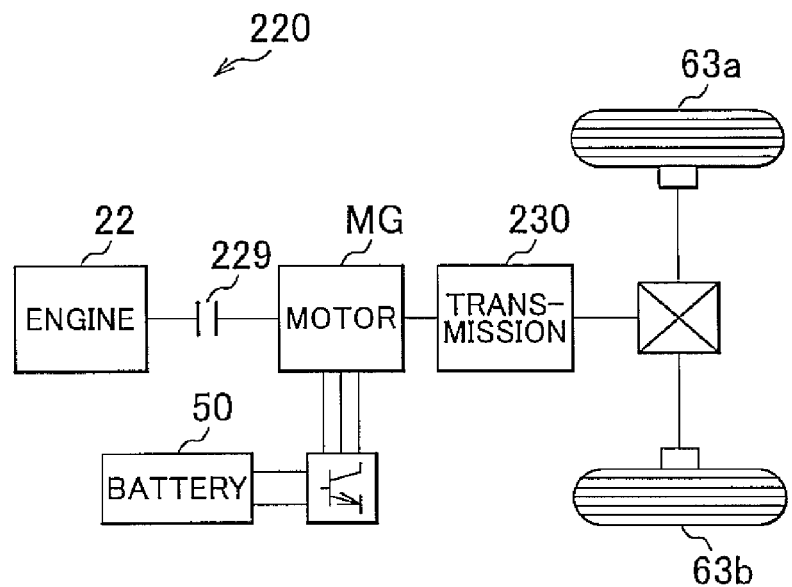
F I G . 10
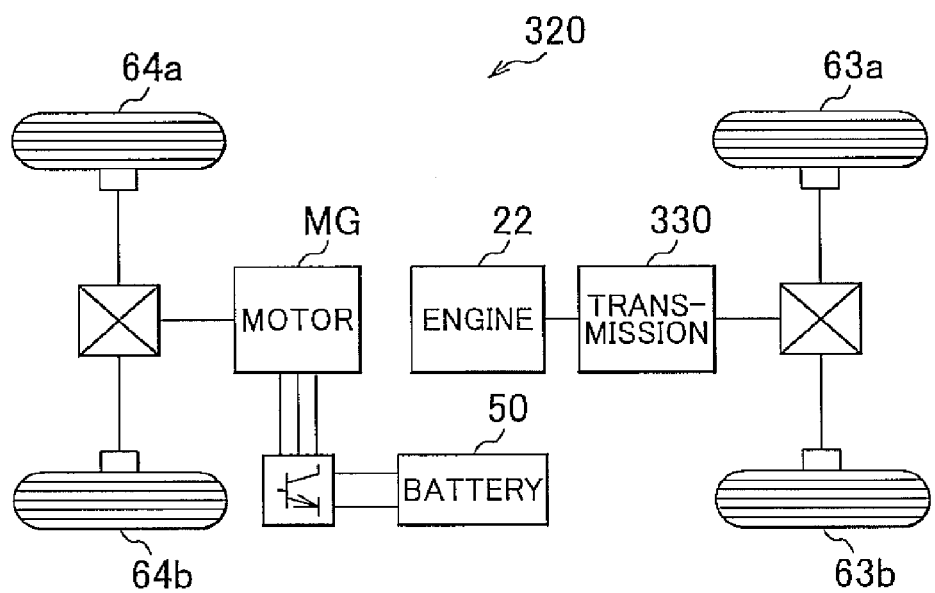

HYBRID VEHICLE

CROSS-REFERENCE TO RELATED APPLICATIONS

This application claims priority to Japanese Patent Application No. 2010-209811 filed on Sep. 17, 2010, which is incorporated herein by reference in its entirety including the specification, drawings and abstract.

BACKGROUND OF THE INVENTION

1. Field of the Invention

The invention relates to a hybrid vehicle. More particularly, the invention relates to a hybrid vehicle provided with an internal combustion engine that has an exhaust gas control apparatus with an exhaust gas control catalyst that purifies exhaust gas provided in an exhaust system, and that is capable of outputting power for running, an electric motor capable of inputting and outputting power for running, and a secondary battery capable of sending and receiving electric power to and from the electric motor.

2. Description of the Related Art

Japanese Patent Application Publication No. 2009-262677 (JP-A-2009-262677), for example, describes one such hybrid vehicle that is provided with an engine in which a catalyst that purifies exhaust gas is provided in an exhaust passage, a first motor-generator, a power split device that is connected to the engine, the first motor-generator, and a drive shaft, a second motor-generator that is connected to the drive shaft, and a battery that sends and receives electric power to and from the first motor-generator and the second motor-generator. When a temperature of the catalyst is higher than a temperature threshold value (such as a temperature at which the degree of catalyst degradation increases, i.e., a temperature at which the catalyst deteriorates) when the vehicle is decelerating, the hybrid vehicle controls a fuel supply valve of the engine such that a fuel cut is not performed, and controls a throttle valve of the engine such that engine torque shifts more from positive torque to negative torque with a higher state-of-charge (SOC) of the battery and as an amount of air that is supplied to the engine becomes greater than an air amount threshold value (such as an air amount that will cause the engine to misfire). With this hybrid vehicle, deterioration of the catalyst and overcharging of the battery are suppressed by controlling the fuel supply valve of the engine so that a fuel cut is not performed, and controlling the throttle valve of the engine such the amount of air supplied to the engine becomes larger than an air amount threshold value and the engine torque becomes negative torque, when the temperature of the catalyst is higher than the temperature threshold value and the SOC of the battery is higher than a SOC threshold value.

With the hybrid vehicle described above, when the temperature of the catalyst is higher than the temperature threshold value when the vehicle is decelerating, the promotion of catalyst degradation is suppressed by controlling the fuel supply valve so that a fuel cut will not be performed and the like. However, in order to further suppress the promotion of catalyst degradation, it is preferable to have more opportunities to perform this control.

SUMMARY OF THE INVENTION

In view of this problem, the invention provides a hybrid vehicle that further suppresses the promotion of degradation of an exhaust gas control catalyst in an exhaust gas control apparatus.

One aspect of the invention relates to a hybrid vehicle provided with an internal combustion engine that has an exhaust gas control apparatus with an exhaust gas control catalyst that purifies exhaust gas provided in an exhaust system, and that is capable of outputting power for running, an electric motor capable of inputting and outputting power for running, and a secondary battery capable of sending and receiving electric power to and from the electric motor. This hybrid vehicle includes a controller that executes catalyst degradation suppression control that controls the internal combustion engine to operate with fuel injection being performed and executes regenerative driving control that controls the electric motor to be regeneratively driven, when a temperature of the exhaust gas control catalyst is equal to or greater than a first predetermined temperature set as a lower limit of a temperature range within which it is assumed that degeneration of the exhaust gas control catalyst will be promoted, as well as when the temperature of the exhaust gas control catalyst is less than the first predetermined temperature and equal to or greater than a second predetermined temperature set as a temperature that is lower than the first predetermined temperature and a power storage percentage that is a percentage of an amount of electric power stored in the secondary battery out of a total capacity of the secondary battery is equal to or greater than a predetermined power storage percentage set beforehand, when there is a predetermined braking request in which there is a braking request while the hybrid vehicle is running with the internal combustion engine operating.

With the hybrid vehicle described above, the controller executes catalyst degradation suppression control that controls the internal combustion engine to operate with fuel injection being performed and executes regenerative driving control that controls the electric motor to be regeneratively driven, when a temperature of the exhaust gas control catalyst is equal to or greater than a first predetermined temperature set as a lower limit of a temperature range within which it is assumed that degeneration of the exhaust gas control catalyst will be promoted, as well as when the temperature of the exhaust gas control catalyst is less than the first predetermined temperature and equal to or greater than a second predetermined temperature set as a temperature that is lower than the first predetermined temperature and a power storage percentage that is a percentage of an amount of electric power stored in the secondary battery out of a total capacity of the secondary battery is equal to or greater than a predetermined power storage percentage set beforehand, when there is a predetermined braking request in which there is a braking request while the hybrid vehicle is running with the internal combustion engine operating. That is, the controller executes the catalyst degradation suppression control for the internal combustion engine when the temperature of the exhaust gas control catalyst is less than the first predetermined temperature and equal to or greater than the second predetermined temperature and the power storage percentage of the secondary battery is equal to or greater than the predetermined power storage percentage, in addition to when the temperature of the exhaust gas control catalyst is equal to or greater than the first predetermined temperature, when there is a predetermined braking request. This enables there to be more opportunities to execute the catalyst degradation suppression control, so degradation of the exhaust gas control catalyst can be further suppressed from being promoted. Braking force can be applied to the vehicle by executing the regenerative driving control for the electric motor. Here, the predetermined power storage percentage may be a power storage percentage that is a predetermined percentage of fully charged, or it may be a power storage percentage that is less than fully charged by a predetermined value.

In the hybrid vehicle described above, the controller may execute the catalyst degradation suppression control for the internal combustion engine and execute the regenerative driving control for the electric motor, when the power storage percentage of the secondary battery is equal to or greater than the predetermined power storage percentage and the secondary battery is charging, when the temperature of the exhaust gas control catalyst is less than the first predetermined temperature and equal to or greater than the second predetermined temperature.

Also, in this hybrid vehicle, the controller may determine that there is a real request to execute the catalyst degradation suppression control when the temperature of the exhaust gas control catalyst is equal to or greater than the first predetermined temperature and determine that there is a temporary request to execute the catalyst degradation suppression control when the temperature of the exhaust gas control catalyst is less than the first predetermined temperature and equal to or greater than the second predetermined temperature, and execute the catalyst degradation suppression control for the internal combustion engine and execute the regenerative driving control for the electric motor, when there is a real request to execute the catalyst degradation suppression control, as well as when there is a temporary request to execute the catalyst degradation suppression control and the power storage percentage of the secondary battery is equal to or greater than the predetermined power storage percentage.

Further, in this hybrid vehicle, the controller may execute the catalyst degradation suppression control for the internal combustion engine and execute the regenerative driving control for the electric motor, irrespective of the power storage percentage of the secondary battery, when a current running state is a temperature increasing running state set as a running state in which the temperature of the exhaust gas control catalyst tends to increase to equal to or greater than first predetermined temperature, when the temperature of the exhaust gas control catalyst is less than the first predetermined temperature and equal to or greater than the second predetermined temperature. This enables there to be more opportunities to execute the catalyst degradation suppression control. In this case, the temperature increasing running state may be a running state in which a vehicle speed is equal to or greater than a predetermined vehicle speed set beforehand and a cumulative air amount that is a cumulative value of an air amount supplied to the internal combustion engine is equal to or greater than a predetermined air amount set beforehand.

Alternatively, in the hybrid vehicle described above, the controller may determine that there is a request to execute the catalyst degradation suppression control when the temperature of the exhaust gas control catalyst is equal to or greater than the second predetermined temperature, and execute the catalyst degradation suppression control for the internal combustion engine and execute the regenerative driving control for the electric motor, irrespective of the power storage percentage of the secondary battery, when an unexecuted degree, that is a degree to which the catalyst degradation suppression control is not executed even though there is a request to execute the catalyst degradation suppression control, is equal to or greater than a predetermined degree set beforehand, when the temperature of the exhaust gas control catalyst is less than the first predetermined temperature and equal to or greater than the second predetermined temperature. This enables there to be more opportunities to execute the catalyst degradation suppression control. In this case, the unexecuted degree may be at least one of a period of time, a percentage, and a number of times that the catalyst degradation suppression control is not executed even though there is a request to execute the catalyst degradation suppression control.

Another aspect of the invention relates to a hybrid vehicle provided with an internal combustion engine that has an exhaust gas control apparatus with an exhaust gas control catalyst that purifies exhaust gas provided in an exhaust system, and that is capable of outputting power for running, an electric motor capable of inputting and outputting power for running, and a secondary battery capable of sending and receiving electric power to and from the electric motor. This hybrid vehicle includes a controller that preferentially executes catalyst degradation suppression control that controls the internal combustion engine to operate with fuel injection being performed over catalytic smell suppression control that controls the internal combustion engine such that fuel injection is stopped and executes regenerative driving control that controls the electric motor to be regeneratively driven, when a temperature of the exhaust gas control catalyst is equal to or greater than a first predetermined temperature set as a lower limit of a temperature range within which it is assumed that degradation of the exhaust gas control catalyst will be promoted, as well as when the temperature of the exhaust gas control catalyst is less than the first predetermined temperature and equal to or greater than a second predetermined temperature set as a temperature that is lower than the first predetermined temperature and a power storage percentage that is a percentage of an amount of electric power stored in the secondary battery out of a total capacity of the secondary battery is equal to or greater than a predetermined power storage percentage set beforehand, when there is a predetermined braking request in which there is a braking request while the hybrid vehicle is running with the internal combustion engine operating.

In the hybrid vehicle described above, the controller preferentially executes catalyst degradation suppression control that controls the internal combustion engine to operate with fuel injection being performed over catalytic smell suppression control that controls the internal combustion engine such that fuel injection is stopped and executes regenerative driving control that controls the electric motor to be regeneratively driven, when a temperature of the exhaust gas control catalyst is equal to or greater than a first predetermined temperature set as a lower limit of a temperature range within which it is assumed that degradation of the exhaust gas control catalyst will be promoted, as well as when the temperature of the exhaust gas control catalyst is less than the first predetermined temperature and equal to or greater than a second predetermined temperature set as a temperature that is lower than the first predetermined temperature and a power storage percentage that is a percentage of an amount of electric power stored in the secondary battery out of a total capacity of the secondary battery is equal to or greater than a predetermined power storage percentage set beforehand, when there is a predetermined braking request in which there is a braking request while the hybrid vehicle is running with the internal combustion engine operating. That is, the controller preferentially executes the catalyst degradation suppression control over the catalytic smell suppression control for the internal combustion engine when the temperature of the exhaust gas control catalyst is less than the first predetermined temperature and equal to or greater than the second predetermined temperature and the power storage percentage of the secondary battery is equal to or greater the predetermined power storage percentage, in addition to when the temperature of the exhaust gas control catalyst is equal to or greater the first predetermined temperature, when there is a predetermined braking request. This enables there to be more opportunities to execute the catalyst degradation suppression control, so degradation of the exhaust gas control catalyst can be further suppressed from being promoted. Braking force can be applied to the vehicle by executing the regenerative driving control for the electric motor. Here, the predetermined power storage percentage may be a power storage percentage that is a predetermined percentage of fully charged, or it may be a power storage percentage that is less than fully charged by a predetermined value.

Also, in this hybrid vehicle, the controller may execute the catalyst degradation suppression control for the internal combustion engine and execute the regenerative driving control for the electric motor, when the power storage percentage of the secondary battery is equal to or greater than the predetermined power storage percentage, when the temperature of the exhaust gas control catalyst is equal to or greater than the first predetermined temperature, as well as when the temperature of the exhaust gas control catalyst is less than the first predetermined temperature and equal to or greater than the second predetermined temperature and a catalyst smell producing condition in which it is assumed that a catalytic smell of the exhaust gas control catalyst will be produced is satisfied.

Also, in this hybrid vehicle, the catalytic smell suppression control may be control that controls the internal combustion engine such that fuel injection is stopped and air supplied to the internal combustion engine is increased.

Yet another aspect of the invention relates to a hybrid vehicle provided with an internal combustion engine that has an exhaust gas control apparatus with an exhaust gas control catalyst that purifies exhaust gas provided in an exhaust system, and that is capable of outputting power for running, an electric motor capable of inputting and outputting power for running, and a secondary battery capable of sending and receiving electric power to and from the electric motor. This hybrid vehicle includes a controller that executes catalyst degradation suppression control that controls the internal combustion engine to operate with fuel injection being performed and executes regenerative driving control that controls the electric motor to be regeneratively driven, when a temperature of the exhaust gas control catalyst is equal to or greater than a first predetermined temperature set as a lower limit of a temperature range within which it is assumed that degeneration of the exhaust gas control catalyst will be promoted, as well as when the temperature of the exhaust gas control catalyst is less than the first predetermined temperature and equal to or greater than a second predetermined temperature set as a temperature that is lower than the first predetermined temperature and a current running state is a temperature increasing running state set as a running state in which the temperature of the exhaust gas control catalyst tends to increase to equal to or greater than the first predetermined temperature, when there is a predetermined braking request in which there is a braking request while the hybrid vehicle is running with the internal combustion engine operating.

In the hybrid vehicle described above, the controller executes catalyst degradation suppression control that controls the internal combustion engine to operate with fuel injection being performed and executes regenerative driving control that controls the electric motor to be regeneratively driven, when a temperature of the exhaust gas control catalyst is equal to or greater than a first predetermined temperature set as a lower limit of a temperature range within which it is assumed that degeneration of the exhaust gas control catalyst will be promoted, as well as when the temperature of the exhaust gas control catalyst is less than the first predetermined temperature and equal to or greater than a second predetermined temperature set as a temperature that is lower than the first predetermined temperature and a current running state is a temperature increasing running state set as a running state in which the temperature of the exhaust gas control catalyst tends to increase to equal to or greater than the first predetermined temperature, when there is a predetermined braking request in which there is a braking request while the hybrid vehicle is running with the internal combustion engine operating. That is, the controller executes the catalyst degradation suppression control for the internal combustion engine when the temperature of the exhaust gas control catalyst is less than the first predetermined temperature and equal to or greater than the second predetermined temperature and the current running state is the temperature increasing running state, in addition to when the temperature of the exhaust gas control catalyst is equal to or greater than the first predetermined temperature, when there is a predetermined braking request. This enables there to be more opportunities to execute the catalyst degradation suppression control, so degradation of the exhaust gas control catalyst can be further suppressed from being promoted. Braking force can be applied to the vehicle by executing the regenerative driving control for the electric motor. Here, the temperature increasing running state may be a running state in which a vehicle speed is equal to or greater than a predetermined vehicle speed set beforehand and a cumulative air amount that is a cumulative value of an air amount supplied to the internal combustion engine is equal to or greater than a predetermined air amount set beforehand.

Also, in this hybrid vehicle, the controller may determine that there is a request to execute the catalyst degradation suppression control when the temperature of the exhaust gas control catalyst is equal to or greater than the predetermined second temperature, and execute the catalyst degradation suppression control for the internal combustion engine and execute the regenerative driving control for the electric motor, irrespective of the current running state, when an unexecuted degree, that is a degree to which the catalyst degradation suppression control is not executed even though there is a request to execute the catalyst degradation suppression control, is equal to or greater than a predetermined degree set beforehand, when the temperature of the exhaust gas control catalyst is less than the first predetermined temperature and equal to or greater than the second predetermined temperature. In this case, the unexecuted degree may be at least one of a period of time, a percentage, and a number of times that the catalyst degradation suppression control is not executed even though there is a request to execute the catalyst degradation suppression control.

Still another aspect of the invention relates to a hybrid vehicle provided with an internal combustion engine that has an exhaust gas control apparatus with an exhaust gas control catalyst that purifies exhaust gas provided in an exhaust system, and that is capable of outputting power for running, an electric motor capable of inputting and outputting power for running, and a secondary battery capable of sending and receiving electric power to and from the electric motor. This hybrid vehicle includes a controller that preferentially executes catalyst degradation suppression control that controls the internal combustion engine to operate with fuel injection being performed over catalytic smell suppression control that controls the internal combustion engine such that fuel injection is stopped and executes regenerative driving control that controls the electric motor to be regeneratively driven, when a temperature of the exhaust gas control catalyst is equal to or greater than a first predetermined temperature set as a lower limit of a temperature range within which it is assumed that degradation of the exhaust gas control catalyst will be promoted, as well as when the temperature of the exhaust gas control catalyst is less than the first predetermined temperature and equal to or greater than a second predetermined temperature set as a temperature that is lower than the first predetermined temperature and a current running state is a temperature increasing running state set as a running state in which the temperature of the exhaust gas control catalyst tends to increase to equal to or greater than the first predetermined temperature, when there is a predetermined braking request in which there is a braking request while the hybrid vehicle is running with the internal combustion engine operating.

In the hybrid vehicle described above, the controller preferentially executes catalyst degradation suppression control that controls the internal combustion engine to operate with fuel injection being performed over catalytic smell suppression control that controls the internal combustion engine such that fuel injection is stopped and executes regenerative driving control that controls the electric motor to be regeneratively driven, when a temperature of the exhaust gas control catalyst is equal to or greater than a first predetermined temperature set as a lower limit of a temperature range within which it is assumed that degradation of the exhaust gas control catalyst will be promoted, as well as when the temperature of the exhaust gas control catalyst is less than the first predetermined temperature and equal to or greater than a second predetermined temperature set as a temperature that is lower than the first predetermined temperature and a current running state is a temperature increasing running state set as a running state in which the temperature of the exhaust gas control catalyst tends to increase to equal to or greater than the first predetermined temperature, when there is a predetermined braking request in which there is a braking request while the hybrid vehicle is running with the internal combustion engine operating. That is, the controller preferentially executes the catalyst degradation suppression control over the catalytic smell suppression control for the internal combustion engine when the temperature of the exhaust gas control catalyst is less than the first predetermined temperature and equal to or greater than the second predetermined temperature and the current running state is the temperature increasing running state, in addition to when the temperature of the exhaust gas control catalyst is equal to or greater than the first predetermined temperature, when there is a predetermined braking request. This enables there to be more opportunities to execute the catalyst degradation suppression control, so degradation of the exhaust gas control catalyst can be further suppressed from being promoted. Braking force can be applied to the vehicle by executing the regenerative driving control for the electric motor. Here, the temperature increasing running state may be a running state in which a vehicle speed is equal to or greater than a predetermined vehicle speed set beforehand and a cumulative air amount that is a cumulative value of an air amount supplied to the internal combustion engine is equal to or greater than a predetermined air amount set beforehand. Also, the catalytic smell suppression control may be control that controls the internal combustion engine such that fuel injection is stopped and air supplied to the internal combustion engine is increased.

Also, in this hybrid vehicle, the controller may execute the catalyst degradation suppression control for the internal combustion engine and execute the regenerative driving control for the electric motor, when the current running state is the temperature increasing running state, when the temperature of the exhaust gas control catalyst is equal to or greater than the first predetermined temperature, as well as when the temperature of the exhaust gas control catalyst is less than the first predetermined temperature and equal to or greater than the second predetermined temperature and a catalyst smell producing condition in which it is assumed that a catalytic smell of the exhaust gas control catalyst will be produced is satisfied.

Still yet another aspect of the invention relates to a hybrid vehicle provided with an internal combustion engine that has an exhaust gas control apparatus with an exhaust gas control catalyst that purifies exhaust gas provided in an exhaust system, and that is capable of outputting power for running, an electric motor capable of inputting and outputting power for running, and a secondary battery capable of sending and receiving electric power to and from the electric motor. This hybrid vehicle includes a controller that determines that there is a request to execute catalyst degradation suppression control that controls the internal combustion engine to operate with fuel injection being performed when the temperature of the exhaust gas control catalyst is equal to or greater than a second predetermined temperature set as a temperature that is lower than a first predetermined temperature set as a lower limit of a temperature range within which it is assumed that degeneration of the exhaust gas control catalyst will be promoted, when there is a predetermined braking request in which there is a braking request while the hybrid vehicle is running with the internal combustion engine operating, and executes the catalyst degradation suppression control for the internal combustion engine and executes regenerative driving control that controls the electric motor to be regeneratively driven, when the temperature of the exhaust gas control catalyst is equal to or greater than the first predetermined temperature, as well as when the temperature of the exhaust gas control catalyst is less than the first predetermined temperature and equal to or greater than the second predetermined temperature and an unexecuted degree, that is a degree to which the catalyst degradation suppression control is not executed even though there is a request to execute the catalyst degradation suppression control, is equal to or greater than a predetermined degree set beforehand.

In the hybrid vehicle described above, the controller determines that there is a request to execute catalyst degradation suppression control that controls the internal combustion engine to operate with fuel injection being performed when the temperature of the exhaust gas control catalyst is equal to or greater than a second predetermined temperature set as a temperature that is lower than a first predetermined temperature set as a lower limit of a temperature range within which it is assumed that degeneration of the exhaust gas control catalyst will be promoted, when there is a predetermined braking request in which there is a braking request while the hybrid vehicle is running with the internal combustion engine operating, and executes the catalyst degradation suppression control for the internal combustion engine and executes regenerative driving control that controls the electric motor to be regeneratively driven, when the temperature of the exhaust gas control catalyst is equal to or greater than the first predetermined temperature, as well as when the temperature of the exhaust gas control catalyst is less than the first predetermined temperature and equal to or greater than the second predetermined temperature and an unexecuted degree, that is a degree to which the catalyst degradation suppression control is not executed even though there is a request to execute the catalyst degradation suppression control, is equal to or greater than a predetermined degree set beforehand. That is, the controller executes the catalyst degradation suppression control for the internal combustion engine when the temperature of the exhaust gas control catalyst is less than the first predetermined temperature and equal to or greater than the second predetermined temperature and the unexecuted degree is equal to or greater than the predetermined degree, in addition to when the temperature of the exhaust gas control catalyst is equal to or greater than the first predetermined temperature, when there is a predetermined braking request. This enables there to be more opportunities to execute the catalyst degradation suppression control, so degradation of the exhaust gas control catalyst can be further suppressed from being promoted. Braking force can be applied to the vehicle by executing the regenerative driving control for the electric motor. Here, the unexecuted degree may be at least one of a period of time, a percentage, and a number of times that the catalyst degradation suppression control is not executed even though there is a request to execute the catalyst degradation suppression control.

Still another aspect of the invention relates to a hybrid vehicle provided with an internal combustion engine that has an exhaust gas control apparatus with an exhaust gas control catalyst that purifies exhaust gas provided in an exhaust system, and that is capable of outputting power for running, an electric motor capable of inputting and outputting power for running, and a secondary battery capable of sending and receiving electric power to and from the electric motor. This hybrid vehicle includes a controller that determines that there is a request to execute catalyst degradation suppression control that controls the internal combustion engine to operate with fuel injection being performed when the temperature of the exhaust gas control catalyst is equal to or greater than a second predetermined temperature set as a temperature that is lower than a first predetermined temperature set as a lower limit of a temperature range within which it is assumed that degeneration of the exhaust gas control catalyst will be promoted, when there is a predetermined braking request in which there is a braking request while the hybrid vehicle is running with the internal combustion engine operating, and preferentially executes the catalyst degradation suppression control over catalytic smell suppression control that controls the internal combustion engine such that fuel injection is stopped and executes regenerative driving control that controls the electric motor to be regeneratively driven, when the temperature of the exhaust gas control catalyst is equal to or greater than the first predetermined temperature, as well as when the temperature of the exhaust gas control catalyst is less than the first predetermined temperature and equal to or greater than the second predetermined temperature and an unexecuted degree, that is a degree to which the catalyst degradation suppression control is not executed even though there is a request to execute the catalyst degradation suppression control, is equal to or greater than a predetermined degree set beforehand.

In the hybrid vehicle described above, the controller determines that there is a request to execute catalyst degradation suppression control that controls the internal combustion engine to operate with fuel injection being performed when the temperature of the exhaust gas control catalyst is equal to or greater than a second predetermined temperature set as a temperature that is lower than a first predetermined temperature set as a lower limit of a temperature range within which it is assumed that degeneration of the exhaust gas control catalyst will be promoted, when there is a predetermined braking request in which there is a braking request while the hybrid vehicle is running with the internal combustion engine operating, and preferentially executes the catalyst degradation suppression control over catalytic smell suppression control that controls the internal combustion engine such that fuel injection is stopped and executes regenerative driving control that controls the electric motor to be regeneratively driven, when the temperature of the exhaust gas control catalyst is equal to or greater than the first predetermined temperature, as well as when the temperature of the exhaust gas control catalyst is less than the first predetermined temperature and equal to or greater than the second predetermined temperature and an unexecuted degree, that is a degree to which the catalyst degradation suppression control is not executed even though there is a request to execute the catalyst degradation suppression control, is equal to or greater than a predetermined degree set beforehand. That is, the controller preferentially executes the catalyst degradation suppression control over the catalytic smell suppression control for the internal combustion engine when the temperature of the exhaust gas control catalyst is less than the first predetermined temperature and equal to or greater than the second predetermined temperature and the unexecuted degree is equal to or greater than the predetermined degree, in addition to when the temperature of the exhaust gas control catalyst is equal to or greater the first predetermined temperature, when there is a predetermined braking request. This enables there to be more opportunities to execute the catalyst degradation suppression control, so degradation of the exhaust gas control catalyst can be further suppressed from being promoted. Braking force can be applied to the vehicle by executing the regenerative driving control for the electric motor. Here, the unexecuted degree may be at least one of a period of time, a percentage, and a number of times that the catalyst degradation suppression control is not executed even though there is a request to execute the catalyst degradation suppression control. Also, the catalytic smell suppression control may be control that controls the internal combustion engine such that fuel injection is stopped and air supplied to the internal combustion engine is increased.

Also, in this hybrid vehicle, the controller may execute the catalyst degradation suppression control for the internal combustion engine and execute the regenerative driving control for the electric motor, when the unexecuted degree is equal to or greater than the predetermined degree, when the temperature of the exhaust gas control catalyst is equal to or greater than the first predetermined temperature, as well as when the temperature of the exhaust gas control catalyst is less than the first predetermined temperature and equal to or greater than the second predetermined temperature and a catalyst smell producing condition in which it is assumed that a catalytic smell of the exhaust gas control catalyst will be produced is satisfied.

Also, this hybrid vehicle may also include a second electric motor that is capable of sending and receiving electric power to and from the secondary battery and outputs torque for adjusting a speed of the internal combustion engine. The controller may control the second electric motor to adjust the speed of the internal combustion engine when executing the catalyst degradation suppression control for the internal combustion engine, and may not execute the catalyst degradation suppression control for the internal combustion engine and may control the second electric motor such that torque is not output, when the secondary battery is fully charged.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 3A and FIG. 3B are flowcharts illustrating one example of a predetermined braking request control routine executed by a hybrid electronic control unit according to the first example embodiment;

FIG. 9 is a block diagram schematically showing the structure of a hybrid vehicle according to a second modified example of the first and second example embodiments; and FIG. 10 is a block diagram schematically showing the structure of a hybrid vehicle according to a third modified example of the first and second example embodiments.

DETAILED DESCRIPTION OF EMBODIMENTS

Next, example embodiments of the invention will be described.

Figure 1:
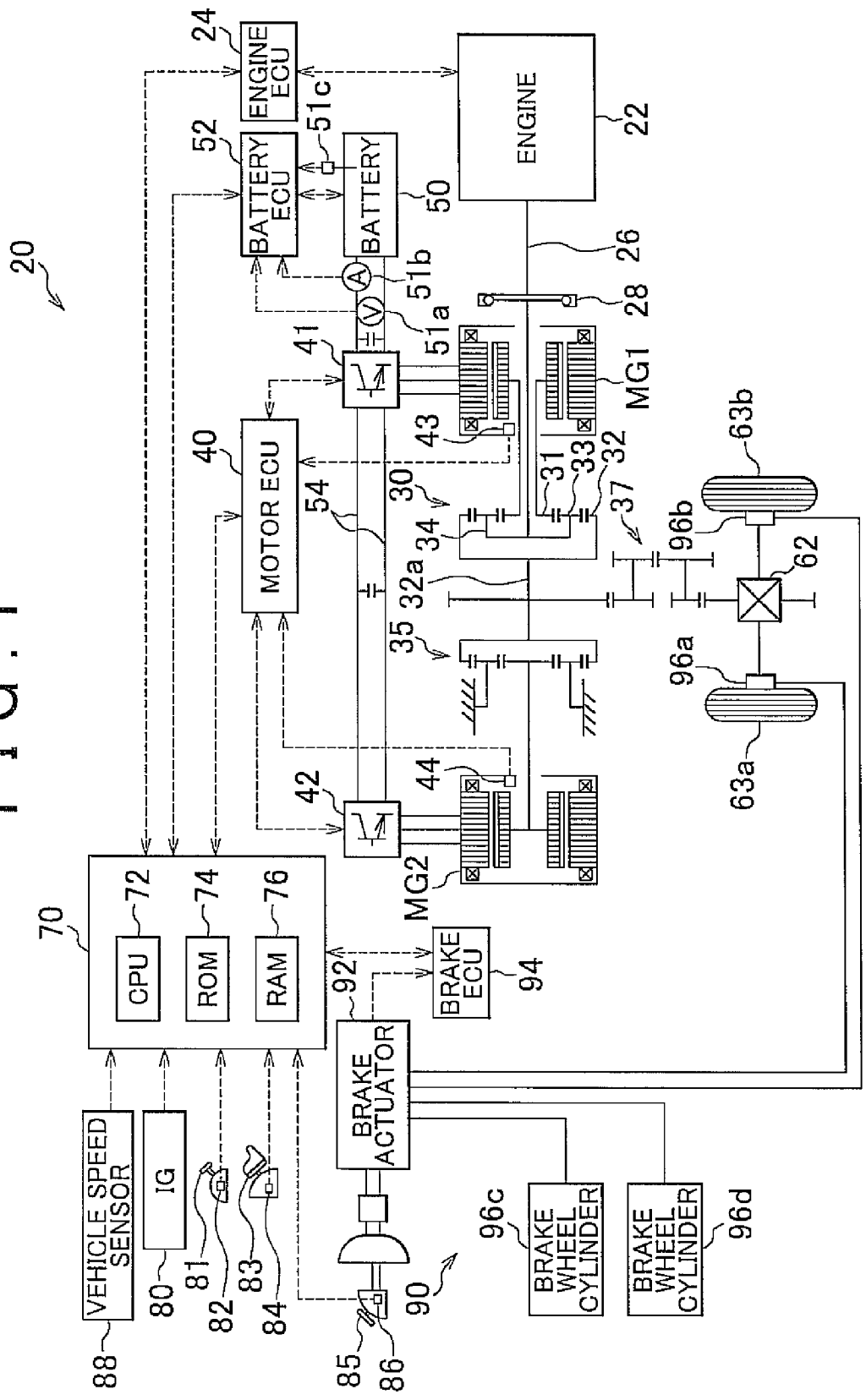
FIG. 1 is a block diagram schematically showing the structure of a hybrid vehicle as a first example embodiment of the invention.

FIG. 1 is a block diagram schematically showing the structure of a hybrid vehicle 20 as a first example embodiment of the invention. As shown in the drawing, the hybrid vehicle 20 of the first example embodiment is provided with an engine 22, a three-shaft-type power splitting/combining device 30 that is connected, via a damper 28, to a crankshaft 26 that serves as an output shaft of the engine 22, a motor MG1 that is capable of generating power and is connected to the power splitting/combining device 30, a reduction gear 35 that is provided on a ring gear shaft 32a that serves as a drive shaft that is connected to the power splitting/combining device 30, a motor MG2 that is connected to this reduction gear 35, a brake actuator 92 for controlling brakes of driving wheels 63a and 63b, and driven wheels that are not shown, (hereinafter the driving wheels 63a and the 63b and the driven wheel, not shown, will collectively be referred to as "wheels"), and a hybrid electronic control unit (hereinafter simply referred to as "hybrid ECU") 70 that controls the overall vehicle.

Figure 2:
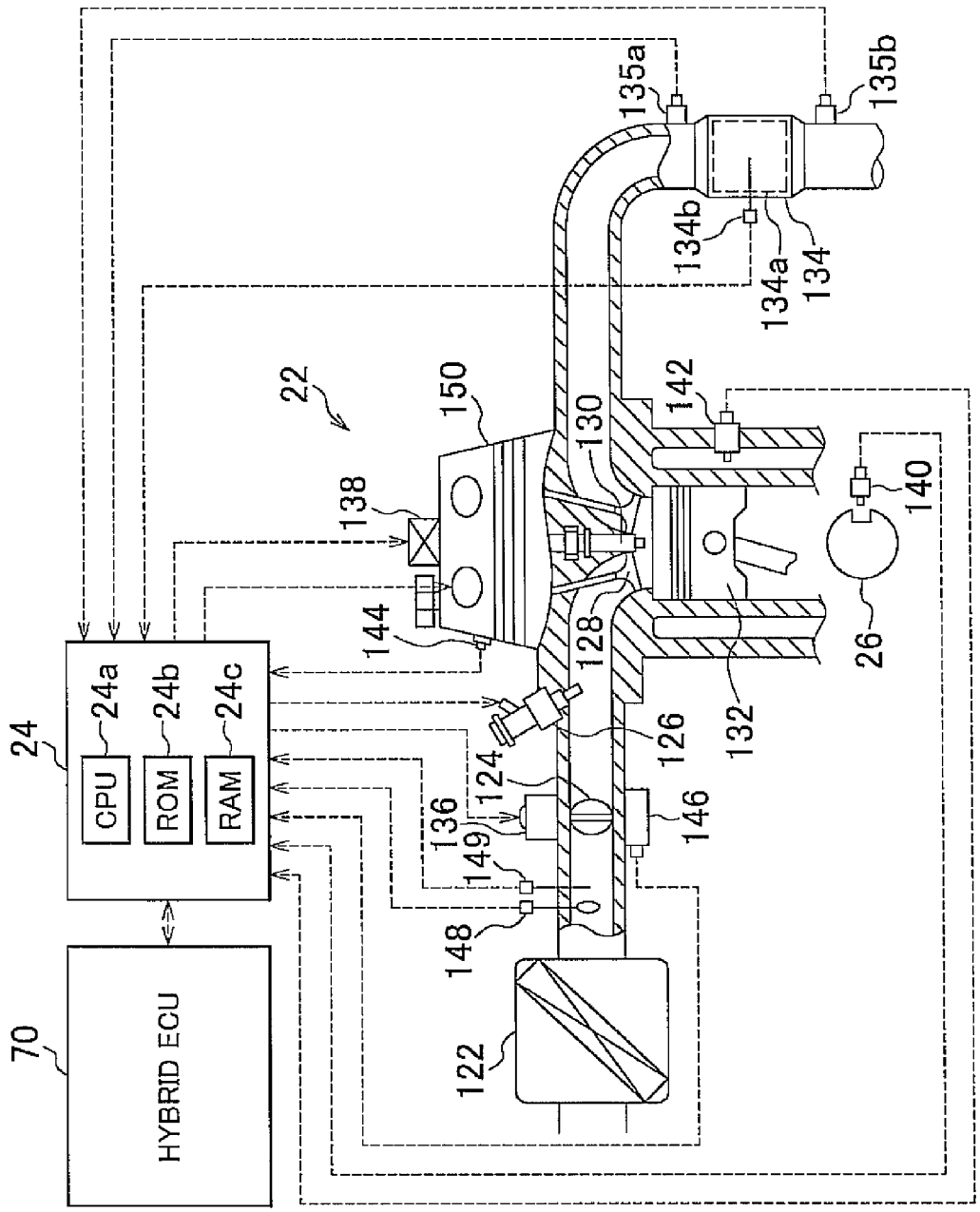
FIG. 2 is a block diagram schematically showing the structure of an engine according to the first example embodiment.

The engine 22 is structured as an internal combustion engine capable of outputting power by combusting a hydrocarbon fuel such as gasoline or light oil, for example. As shown in FIG. 2, air that has been cleaned by an air cleaner 122 is drawn in via a throttle valve 124, and gasoline is injected from a fuel injection valve 126. The drawn in air and gasoline are mixed to create an air-fuel mixture, which is drawn into a combustion chamber via an intake valve 128 and then ignited and combusted by an electric spark from a spark plug 130. The reciprocating motion of a piston 132 that is pushed down by the energy generated from this combustion is converted into rotary motion of the crankshaft 26. Exhaust gas from the engine 22 is discharged into the outside air via an exhaust gas control apparatus 134 that has exhaust gas control catalyst (a three-way catalyst) 134a that purifies noxious components, i.e., carbon monoxide (CO), hydrocarbons (HC), and oxides of nitrogen (NOx).

The engine 22 is controlled by an engine electronic control unit (hereinafter simply referred to as "engine ECU") 24. The engine ECU 24 is configured as a microprocessor that is centered around a CPU 24a. In addition to the CPU 24a, the engine ECU 24 has ROM 24b in which processing programs are stored, RAM 24c that temporarily stores data, and input/output ports and a communication port, not shown. Signals from various sensors that detect the state of the engine 22 are input to the engine ECU 24 via the input port. Some examples of these signals are a signal indicative of the crank position from a crank position sensor 140 that detects a rotational position of the crankshaft 26, a signal indicative of a coolant temperature signal Tw from a coolant temperature sensor 142 that detects a temperature of coolant of the engine 22, a signal indicative of cylinder internal pressure from a pressure sensor, not shown, provided inside the combustion chamber, a signal indicative of a cam position from a cam position sensor 144 that detects a rotational position of a cam shaft that opens and closes the intake valve 128 that draws the air-fuel mixture into the combustion chamber and an exhaust valve that discharges exhaust gas from the combustion chamber, a signal indicative of a throttle position from a throttle valve position sensor 146 that detects a position of the throttle valve 124, a signal indicative of an intake air amount Qa from an airflow meter 148 provided in an intake air duct, a signal indicative of an intake air temperature Tin from a temperature sensor 149 provided in the same intake air duct, a signal indicative of a catalyst temperature Tc from a temperature sensor 134b that detects a temperature of the exhaust gas control catalyst 134a, a signal indicative of an air-fuel ratio AF from an air-fuel ratio sensor 135a, and an oxygen signal Vo from an oxygen sensor 135b. Also, the engine ECU 24 outputs various control signals for driving the engine 22 via the output port. Some examples of these signals are a drive signal to the fuel injection valve 126, a drive signal to a throttle motor 136 that adjusts the position of the throttle valve 124, a control signal to an ignition coil 138 that is integrated with an igniter, and a control signal to a variable valve timing mechanism 150 that is able to change the opening and closing timing of the intake valve 128. The engine ECU 24 communicates with the hybrid ECU 70, and controls the operation of the engine 22 according to the control signals from the hybrid ECU 70 and outputs data related to the operating state of the engine 22 as necessary. The engine ECU 24 calculates the rotation speed of the crankshaft 26, i.e., the engine speed Ne of the engine 22, based on the crank position obtained from the crank position sensor 140, and calculates the volumetric efficiency (i.e., the ratio of the volume of air that is actually drawn in per one cycle to the stroke volume per one cycle of the engine 22) KL based on the intake air amount Qa obtained from the airflow meter 148 and the engine speed Ne of the engine 22.

The power splitting/combining device 30 includes a sun gear 31 that is a gear with external teeth, a ring gear 32 that is a gear with internal teeth that is arranged on the same axis as the sun gear 31, a plurality of pinion gears 33 that are in mesh with both the sun gear 31 and the ring gear 32, and a carrier 34 that rotatably and revolvably retains the plurality of pinion gears 33. The power splitting/combining device 30 is structured as a planetary gear that performs differential operation with the sun gear 31, the ring gear 32, and the carrier 34 as the rotating elements. In the power splitting/combining device 30, the crankshaft 26 of the engine 22 is coupled to the carrier 34, the motor MG1 is coupled to the sun gear 31, and the reduction gear 35 is coupled via the ring gear shaft 32a to the ring gear 32. When the motor MG1 functions as a generator, power from the engine 22 that is input from the carrier 34 is divided between the sun gear 31 side and the ring gear 32 side according to the gear ratio of sun gear 31 and the ring gear 32. When the motor MG1 functions as an electric motor, power from the engine 22 that is input from the carrier 34 is combined with power from the motor MG1 that is input from the sun gear 31, and the combined power is output to the ring gear 32 side. Power output to the ring gear 32 is ultimately output to the driving wheels 63a and 63b of the vehicle from the ring gear shaft 32a via a gear mechanism 37 and differential gear 62.

The motors MG1 and MG2 are structured as well-known synchronous motor-generators capable of operating as both a generator and a motor, and send and receive electric power to and from a battery 50 via inverters 41 and 42. A power line 54 that connects the inverters 41 and 42 to the battery 50 is structured as a positive bus and a negative bus shared by both of the inverters 41 and 42, such that electric power generated by one motor (either the MG1 or the MG2) can be consumed by the other motor. Therefore, the battery 50 is charged by electric power generated by one of the motors MG1 and MG2 and discharged if the electric power of one of the motors MG1 and MG2 is insufficient. If the electric power from the motors MG1 and MG2 is balanced, the battery 50 will neither be charged nor discharged. Both of the motors MG1 and MG2 are drivingly controlled by a motor electronic control unit (hereinafter, simply referred to as a "motor ECU") 40. This motor ECU 40 receives signals necessary for drivingly controlling the motors MG1 and MG2, such as signals from rotational position detecting sensors 43 and 44 that detect the rotational position of the rotors of the motors MG1 and MG2, and the phase current applied to the motors MG1 and MG2 that is detected by current sensors, not shown, and the like. The motor ECU 40 outputs switching control signals to the inverters 41 and 42, and the like. Further, the motor ECU 40 communicates with the hybrid ECU 70 and drivingly controls the motors MG1 and MG2 based on control signals and the like from the hybrid ECU 70, as well as outputs data related to the operating states of the motors MG1 and MG2 to the hybrid ECU 70 when necessary. The motor ECU 40 also calculates rotation speeds Nm1 and Nm2 of the motors MG1 and MG2 based on the signals from the rotational position detecting sensors 43 and 44.

The battery 50 is structured as a lithium-ion secondary battery, for example, and is controlled by a battery electronic control unit (hereinafter, simply referred to as a "battery ECU") 52. This battery ECU 52 receives signals necessary for controlling the battery 52, such as a signal indicative of a terminal voltage Vb from a voltage sensor 51a arranged between the terminals of the battery 50, a signal indicative of a charge-discharge current Ib (a positive value when the battery 50 is discharging) from a current sensor 51b provided in the power line 54 that is connected to an output terminal of the battery 50, and a signal indicative of a battery temperature Tb from a temperature sensor 51c mounted to the battery 50, and the like. The battery ECU 52 communicates with the hybrid ECU 70 and outputs data related to the state of the battery 50 to the hybrid ECU 70 when necessary. Further, to control the battery 50, the battery ECU 52 calculates a power storage percentage SOC, that is a percentage of the amount of power stored in the battery 50 out of the total capacity (the total power storage capacity) of the battery 50, based on the cumulative value of the charge-discharge current Ib detected by the current sensor 51b, and calculates an input limit Win that is the maximum allowable charge electric power, i.e., the maximum amount of electric power allowed to be charged to the battery 50, and an output limit Wout that is the maximum allowable discharge electric power, i.e., the maximum amount of electric power allowed to be discharged from the battery 50, based on the calculated power storage percentage SOC and the battery temperature Tb. The input and output limits Win and Wout of the battery 50 are able to be set by first setting basic values for the input and output limits Win and Wout based on the battery temperature Tb, as well as setting an output limit correction coefficient and an input limit correction coefficient based on the power storage percentage SOC of the battery 50, and then multiplying the set basic value of the input limit Win by the input limit correction coefficient to obtain the input limit Win, and multiplying the set basic value of the output limit Wout by the output limit correction coefficient to obtain the output limit Wout.

A brake actuator 92 is configured to be able to adjust the hydraulic pressure of brake wheel cylinders 96a to 96d, such that braking force attributed to the brake, of the braking force that acts on the vehicle from the vehicle speed V and the pressure (i.e., brake pressure) of a brake master cylinder 90 that is generated in response to depression of a brake pedal 85, acts on the wheels (i.e., the driving wheels 63a and 63b and the driven wheels), as well as to be able to adjust the hydraulic pressure of the brake wheel cylinders 96a to 96d such that braking force acts on the wheels irrespective of depression of the brake pedal 85. Hereinafter, the braking force applied to the wheels by operation of the brake actuator 92 may be referred to as a "hydraulic brake." The brake actuator 92 is controlled by a brake electronic control unit (hereinafter simply referred to as a "brake ECU") 94. The brake ECU 94 receives signals indicative of the wheel speed from wheel speed sensors, not shown, provided on the wheels (i.e., the driving wheels 63a and 63b and the driven wheels) and a signal indicative of a steering angle from a steering angle sensor, also not shown, and the like, and performs an Antilock Brake System function (ABS) that prevents one of the driving wheels 63a and 63b and the driven wheels from slipping as a result of locking up when the driver depresses the brake pedal 85, Traction Control (TRC) that prevents one of the driving wheels 63a and 63b from slipping due to rotating idly when the driver depresses an accelerator pedal 83, and Vehicle Stability Control (VSC) that maintains the posture when the vehicle turns, and the like. The brake ECU 94 communicates with the hybrid ECU 70 and drivingly controls the brake actuator 92 according to control signals from the hybrid ECU 70, as well as outputs data related to the state of the brake actuator 92 to the hybrid ECU 70 when necessary.

The hybrid ECU 70 is formed as a microprocessor that is centered around a CPU 72, and includes, in addition to the CPU 72, ROM 74 in which processing programs are stored, RAM 76 that temporarily stores data, and input/output ports and a communication port, not shown, and the like. Various signals are input to the hybrid ECU 70 via the input port. Some examples of these signals are an ignition signal from an ignition switch 80, a signal indicative of a shift position SP from a shift position sensor 82 that detects an operating position of a shift lever 81, a signal indicative of an accelerator operation amount Acc from an accelerator pedal position sensor 84 that detects the depression amount of the accelerator pedal 83, a signal indicative of a brake pedal position BS from a brake pedal position sensor 86 that detects the depression amount of the brake pedal 85, and a signal indicative of a vehicle speed V from a vehicle speed sensor 88, and the like. As described above, the hybrid ECU 70 is connected to the engine ECU 24, the motor ECU 40, the battery ECU 52, and the brake ECU 94 via the communication port, and sends and receives various control signals and data to and from the engine ECU 24, the motor ECU 40, the battery ECU 52, and the brake ECU 94.

In the hybrid vehicle 20 of this example embodiment structured as described above, a required torque to be output to the ring gear shaft 32a that serves as the drive shaft is calculated based on the vehicle speed V and the accelerator operation amount Acc that corresponds to the depression amount of the accelerator pedal 83 by the driver. The engine 22, the motor MG1, and the motor MG2 are controlled such that the required power that corresponds to this required torque is output to the ring gear shaft 32a. Some examples of operation control modes of the engine 22, the motor MG1, and the motor MG2 are a torque converting operating mode, a charge-discharge operating mode, and a motor operating mode. In the torque converting operating mode, the engine 22 is controlled to output power comparable to the required power, and the motor MG1 and the motor MG2 are controlled to output all of the power output from the engine 22 to the ring gear shaft 32a after it has been converted to torque by the power splitting/combining device 30, the motor MG1, and the motor MG2. In the charge-discharge operating mode, the engine 22 is controlled to output power comparable to the sum of the required power and the electric power needed to be charged to or discharged from the battery 50, and the motor MG1 and the motor MG2 are controlled to output the required power to the ring gear shaft 32a after all or some of the power output from the engine 22 with the charge-discharge of the battery 50 is converted to torque by the power splitting/combining device 30, the motor MG1, and the motor MG2. In the motor operating mode, the engine 22 is stopped and the motor MG2 is controlled to output power comparable to the required power to the ring gear shaft 32a.

Figure 3A:
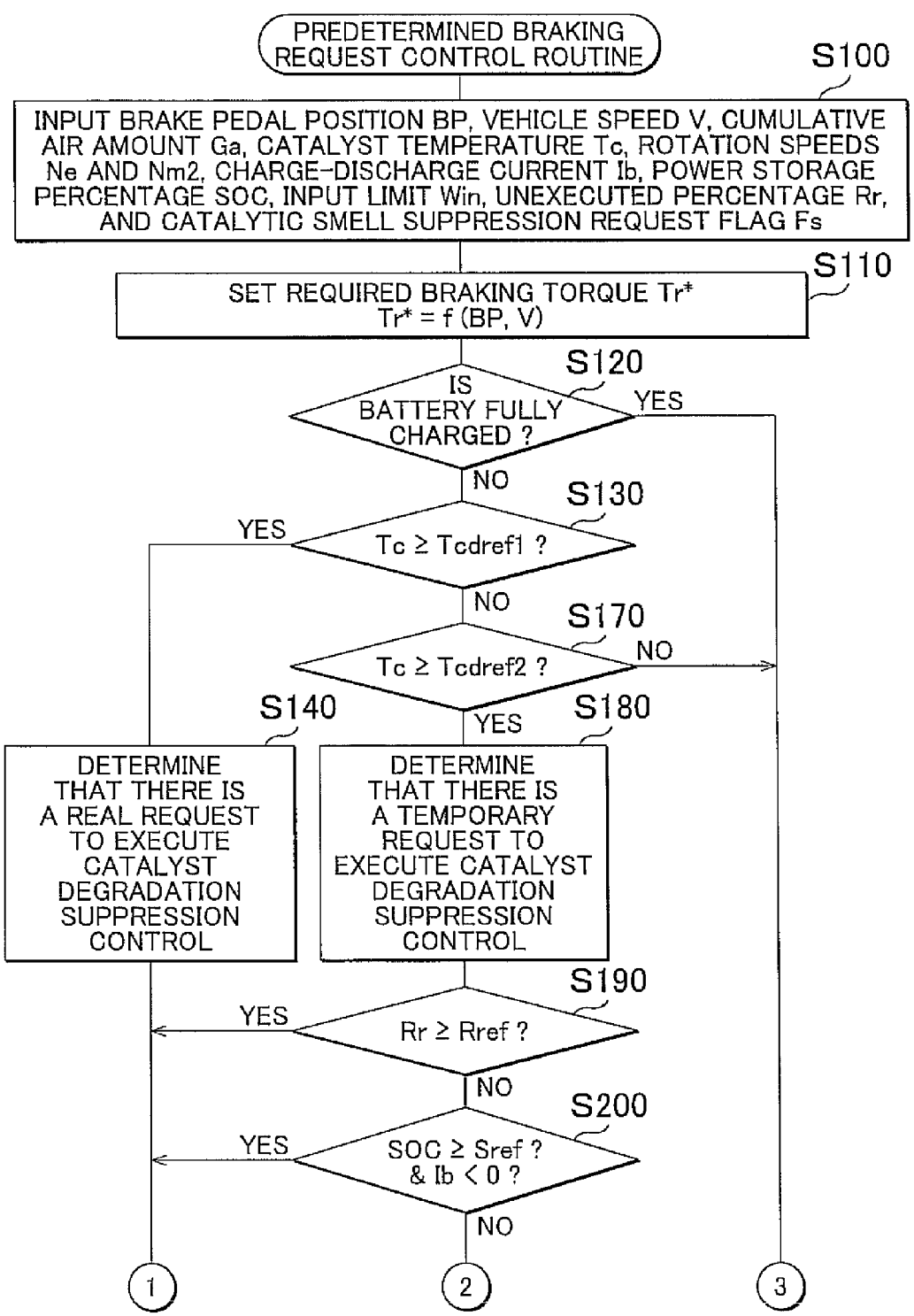

Next, the operation of the hybrid vehicle 20 according to the first example embodiment structured as described above, or more specifically, the operation when there is a predetermined braking request in which there is a braking request by the brake pedal 85 being depressed or the accelerator pedal 83 being released while vehicle is running with the engine 22 operating will be described. FIGS. 3A and 3B are a flowchart illustrating one example of a routine of control when there is a predetermined braking request (hereinafter simply referred to as a "predetermined braking request control routine") that is executed by the hybrid ECU 70. This routine is repeatedly executed at predetermined intervals of time (such as every several milliseconds) when there is a predetermined braking request.

When the predetermined braking request control routine is executed, the CPU 72 of the hybrid ECU 70 first performs a step to input data such as the brake pedal position BP obtained from the brake pedal position sensor 86, the vehicle speed V obtained from the vehicle speed sensor 88, the cumulative air amount Ga as a cumulative value of the intake air amount Qa for a predetermined period of time (such as several seconds or several minutes), the catalyst temperature Tc, the engine speed Ne of the engine 22, the rotation speed Nm2 of the motor MG2, the charge-discharge current Ib of the battery 50, the power storage percentage SOC of the battery 50, the input limit Win of the battery 50, an unexecuted percentage Rr that is the percentage that catalyst degradation suppression control is not executed even though there is a request to execute control of the engine 22 to suppress the promotion of the degradation of the exhaust gas control catalyst 134a (hereinafter referred to as "catalyst degradation suppression control") when there is a predetermined braking request, and a catalytic smell suppression request flag Fs that indicates whether there is a request to execute control of the engine 22 to suppress catalytic smell of the exhaust gas control catalyst 134a (hereinafter referred to as "catalytic smell suppression control"), and the like (step S100). Here, the cumulative air amount Ga is calculated as the cumulative value of the intake air amount Qa obtained from the airflow meter 148 from before a predetermined period of time, and is received from the engine ECU 24 through communication. The catalyst temperature Tc is detected by the temperature sensor 134b and is received from the engine ECU 24 through communication. The engine speed Ne of the engine 22 is calculated based on the signal from the crank position sensor 140 and is received from the engine ECU 24 through communication. The rotation speed Nm2 of the motor MG2 is calculated based on the rotational position of the rotor of the motor MG2 detected by the rotational position detecting sensor 44 and is received from the motor ECU 40 through communication. The charge-discharge current Ib of the battery 50 is detected by the current sensor 51b and is received from the battery ECU 52 through communication. The power storage percentage SOC of the battery 50 is calculated based on the cumulative value of the charge-discharge current Ib obtained from the current sensor 51b and is received from the battery ECU 52 through communication. The input limit Win of the battery 50 is calculated based on the power storage percentage SOC and the battery temperature Tb of the battery 50 obtained from the temperature sensor 51c and is received from the battery ECU 52 through communication. The unexecuted percentage Rr of the catalyst degradation suppression control is calculated as the percentage of the time that the catalyst degradation suppression control is not executed (i.e., the time that normal fuel cut control or catalytic smell suppression control that will be described later is executed, in the first example embodiment) out of the time that there is a request to execute the catalyst degradation suppression control (either a real request or a temporary request for execution that will be described later), when there is a predetermined braking request, according to an unexecuted percentage setting routine, not shown, that is executed by the hybrid ECU 70. The catalytic smell suppression request flag Fs is a flag for which a value of 0 is set as an initial value, and a value of 1 is set when it is determined that there is a request to execute the catalytic smell suppression control when a catalytic smell producing condition in which it is assumed that the exhaust gas control catalyst 134a will produce a catalytic smell is satisfied, and thereafter a value of 0 is set when the catalytic smell producing condition ceases to be satisfied either due to the catalytic smell suppression control being executed or not due to the catalytic smell suppression control being executed. This catalytic smell suppression request flag Fs is set according to a catalytic smell suppression request flag setting routine, not shown, that is executed by the engine ECU 24, and is received from the engine ECU 24 through communication. Hereinafter, the catalytic smell suppression request flag Fs will be described in detail.

First, in the first example embodiment, the catalytic smell producing condition includes a condition that there be a history of a fuel increase amount correction, a condition that the exhaust gas control catalyst 134a be exposed to a rich atmosphere, and a condition that the catalyst temperature Tc be equal to or greater than a threshold value Tcsref (such as 600° C. or 620° C. or the like) that is set as a lower limit of a temperature range within which a catalytic smell tends to be produced. The catalytic smell of the exhaust gas control catalyst 134a is a sulfur smell from hydrogen sulfide, and is produced as a result of the sulfur content in the fuel that has been absorbed and stored by the exhaust gas control catalyst 134a being released from the exhaust gas control catalyst 134a and reduced to hydrogen sulfide when the exhaust gas control catalyst 134a is exposed to a rich atmosphere. This kind of reaction is known to be promoted when the catalyst temperature Tc is relatively high. On the other hand, when the exhaust gas control catalyst 134a is exposed to a lean atmosphere, sulfur is not easily released from the exhaust gas control catalyst 134a, so the production of catalytic smell is suppressed. Therefore, in this first example embodiment, based on this, when there is a history of a fuel increase amount correction, the exhaust gas control catalyst 134a is being exposed to a rich atmosphere, and the catalyst temperature Tc is equal to or greater than the threshold value Tcsref, it is determined that the catalytic smell producing condition is satisfied, so a value of 1 is set for the catalytic smell suppression request flag Fs. When there is no history of a fuel increase amount correction, or when the exhaust gas control catalyst 134a is not being exposed to a rich atmosphere, or the catalyst temperature Tc is less than the threshold value Tcsref, it is determined that the catalytic smell producing condition is not satisfied, so a value of 0 is set for the catalytic smell suppression request flag Fs. The fuel increase amount correction is executed in order to cool the exhaust gas control catalyst 134a or to increase the output of the engine 22 or the like. In this first example embodiment, the history of a fuel increase amount correction is reset when a predetermined of time has passed after a fuel increase amount correction has been performed.

Figure 4:
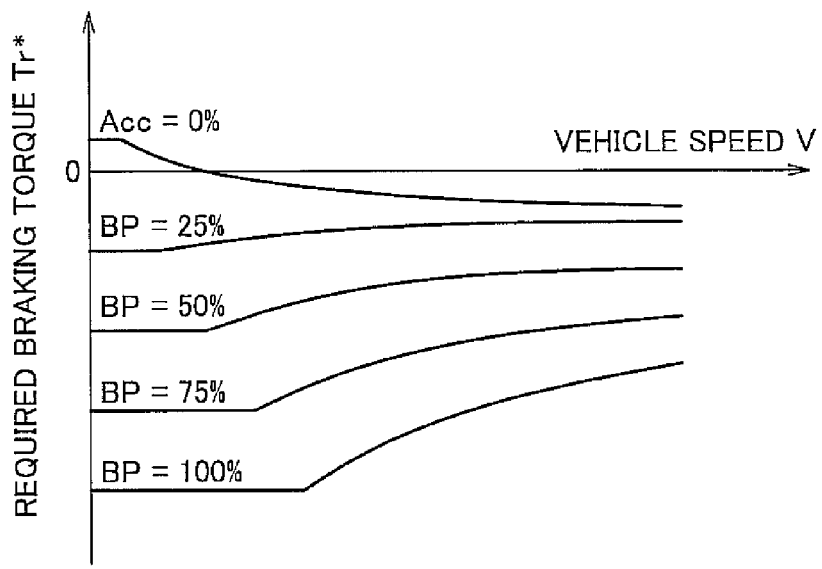
FIG. 4 is a view of an example of a required braking torque setting map.

After the data is input in this way, a required braking torque Tr* to be output to the ring gear shaft 32a that serves as the drive shaft that is coupled to the driving wheels 63a and 63b is set as braking torque required for the vehicle, based on the input brake pedal position BP and vehicle speed V (step S110). In this first example embodiment, the relationships among the brake pedal position BP, the vehicle speed V, and the required braking torque Tr* are stored in advance in the ROM 74 in the form of a required braking torque setting map. When a brake pedal position BP and a vehicle speed V are given, a corresponding required braking torque Tr* is derived and set from the stored map. FIG. 4 shows an example of a required braking torque setting map. In this first example embodiment, negative torque is used as braking torque. Accordingly, a negative value is also used in an expression when outputting braking torque from the motor MG2.

Continuing on, when a determination as to whether the battery 50 is fully charged (e.g., 85% or 90% or 95% etc.) is made (step S120) and it is determined that the battery 50 is not fully charged, the catalyst temperature Tc is compared to a threshold value Tcdref1 set beforehand (step S130). Here, the threshold value Tcdref1 is used to determine whether degradation of the exhaust gas control catalyst 134a is easily promoted. This threshold value Tcdref1 is set as a lower limit of a temperature range within which it is assumed that degradation of the exhaust gas control catalyst 134a will be promoted (or more specifically, a temperature range within which it is assumed that degradation of the exhaust gas control catalyst 134a will be promoted when the exhaust gas control catalyst 134a is exposed to a lean atmosphere). For example, 800° C. or 820° C. or the like may be used for the threshold value Tcdref1.

When the catalyst temperature Tc is equal to or greater than the threshold value Tcdref1, it is determined that there is a real request to execute catalyst degradation suppression control that is control of the engine 22 to suppress the promotion of the degradation of the exhaust gas control catalyst 134a (step S140), and a command to execute the catalyst degradation suppression control is output to the engine ECU 24 (step S150). Upon receiving this command to execute the catalyst degradation suppression control, the engine ECU 24 performs control of the engine 22 so that the engine 22 operates on its own at a predetermined engine speed Ne (such as idle speed or slightly higher than idle speed) (more specifically, performs intake air amount control that controls the opening amount of the throttle valve 124, fuel injection control that controls the fuel injection quantity from the fuel injection valve 126, ignition control that controls the ignition timing of the spark plug 130, and variable intake valve timing control that controls the opening and closing timing of the intake valve 128, and the like), as the catalyst degradation suppression control. As a result, exhaust gas after the air-fuel mixture is combusted, instead of air, flows to the exhaust gas control catalyst 134a, so the exhaust gas control catalyst 134a in which the catalyst temperature Tc is equal to or greater than the threshold value Tcdref1 can be inhibited from being exposed to a lean atmosphere, thus making it possible to suppress degradation of the exhaust gas control catalyst 134a from being promoted.

Figure 5:
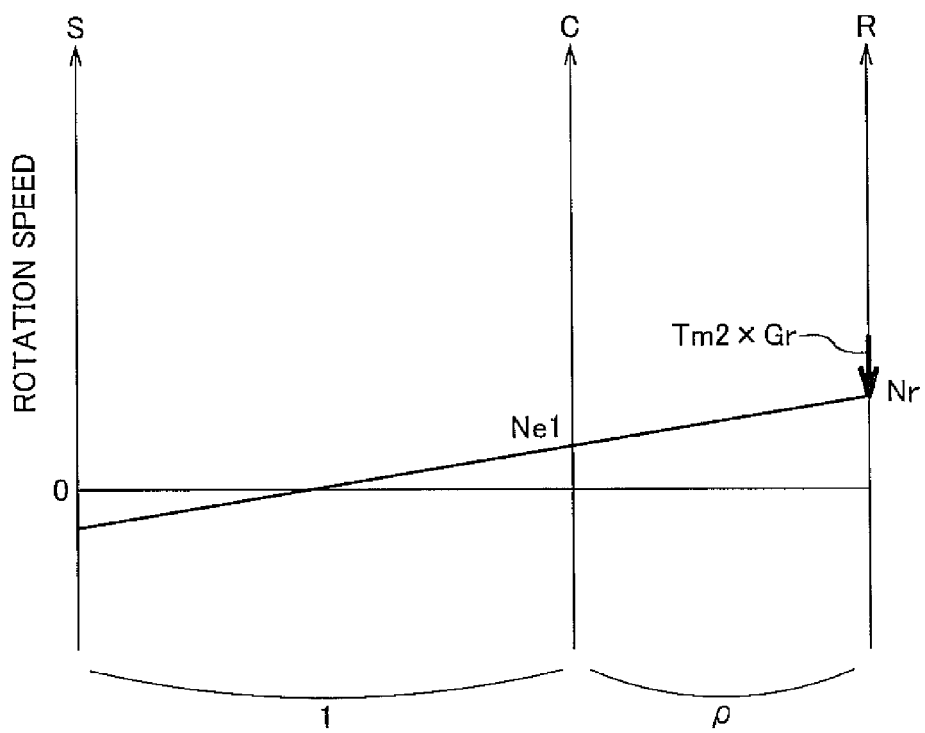
FIG. 5 is a view of an example of an alignment graph for dynamically illustrating rotating elements of a power splitting/combining device when outputting regenerative torque from a motor MG2 without outputting braking force from a hydraulic brake and without outputting torque from a motor MG1, according to the first example embodiment.

Continuing on, a torque command Tm1* as torque to be output from the motor MG1 is set according to Expression (1) below such that the engine speed Ne of the engine 22 comes to match a predetermined engine speed Ne1 (step S160). A temporary torque Tm2tmp that is temporary value of torque to be output from the motor MG2 is calculated according to Expression (2) below by adding the quotient of the set torque command Tm1* divided by a gear ratio ρ of the power splitting/combining device 30 to the required braking torque Tr*, and then dividing the obtained value by a gear ratio Gr of the reduction gear 35 (step S260). A torque limit Tm2min as a lower limit of torque that may be output from the motor MG2 is calculated according to Expression (3) below by dividing i) the difference of the input limit Win of the battery 50 minus the consumed electric power (i.e., the generated electric power) of the motor MG1 that is obtained by multiplying the set torque command Tm1* by the current rotation speed Nm1 of the motor MG1, by ii) the rotation speed Nm2 of the motor MG2 (step S262). A torque command Tm2* of the motor MG2 is set by limiting the set temporary torque Tm2tmp by the torque limit Tm2min according to Expression (4) (step S264), and a value obtained by subtracting the product of the gear ratio Gr of the reduction gear 35 multiplied by the set torque command Tm2 of the motor MG2 from the required braking torque Tr* is set as a brake torque command Tb* required for the hydraulic brake when that value is converted to a value at the ring gear shaft 32a that serves as the drive shaft (step S270). Here, Expression (1) is a relational expression of feedback control for operating the engine 22 at the predetermined engine speed Ne1. In Expression (1), the first term on the right side, k1, is a gain of a proportional term, and the second term on the right side, k2, is a gain of an integral term. In the first example embodiment, the catalyst degradation suppression control controls the engine 22 such that the engine 22 operates on its own at the predetermined engine speed Ne1. Therefore, when the engine speed Ne of the engine 22 is equal to the predetermined engine speed Ne1, a value of 0 is set for the torque command Tm1* of the motor MG1. When the engine speed Ne of the engine 22 deviates from the predetermined engine speed Ne1 (for example, until the engine speed Ne of the engine 22 reaches the predetermined engine speed Ne1 after there is a braking request while the engine 22 is operating at a higher speed than the predetermined engine speed Ne1, or when the engine speed Ne of the engine 22 fluctuates thereafter), a value other than a value of 0 is set for the torque command Tm1* of the motor MG1. Also, FIG. 5 is a view of an example of an alignment graph that illustrates the dynamic relationship between the rotation speed and the torque of rotating elements of the power splitting/combining device 30 when outputting regenerative torque from the motor MG2 (i.e., when the motor MG2 is regeneratively driven) without outputting braking force from the hydraulic brake and without outputting torque from the motor MG1. In the drawing, the S axis on the left represents the rotation speed of the sun gear 31 that is the rotation speed Nm1 of the motor MG1, the C axis represents the rotation speed of the carrier 34 that is the engine speed Ne of the engine 22, and the R axis represents the rotation speed Nr of the ring gear 32 that is obtained by dividing the rotation speed Nm2 of the motor MG2 by the gear ratio Gr of the reduction gear 35. Expression (2) can easily be derived using this alignment graph.

$$Tm1^* = k1 \times (Ne^* - Ne) + k2 \times \int (Ne^* - Ne)dt \quad (1)$$

$$Tm2tmp = (Tr^* + Tm1^*/\rho)/Gr \quad (2)$$

$$Tm2\min = (Win - Tm1^* \times Nm1)/Nm2 \quad (3)$$

$$Tm2^* = \max(Tm2tmp, Tm2\min) \quad (4)$$

When the torque commands Tm1* and Tm2* of the motors MG1 and MG2 and the brake torque command Tb* are set in this way, the torque commands Tm1* and Tm2* of the motors MG1 and MG2 are output to the motor ECU 40, and the brake torque command Tb* is output to the brake ECU 94 (step S280). Then this cycle of the routine ends. Upon receiving the torque commands Tm1* and Tm2*, the motor ECU 40 performs switching control of the switching elements of the inverters 41 and 42 so that the motor MG1 is driven by the torque command Tm1* and the motor MG2 is driven by the torque command Tm2*. Also, upon receiving the brake torque command Tb*, the brake ECU 94 controls the driving of the brake actuator 92 so that the braking force from the brake wheel cylinders 96a to 96d comes to match torque corresponding to the brake torque command Tb* when that braking force is converted to a value at the ring gear shaft 32a. As a result, the braking torque that becomes the required braking torque Tr* when converted to a value at the ring gear shaft 32a from the torque output by the motor MG2 and the braking force from the brake wheel cylinders 96a to 96d can be applied to the vehicle.

If the catalyst temperature Tc is less than the threshold value Tcdref1 in step S130, the catalyst temperature Tc is compared with a threshold value Tcdref2 (such as 750° C. or 770° C. or the like) that is set as a temperature lower than the threshold value Tcdref1 (step S170). If the catalyst temperature Tc is equal to or greater than the threshold value Tcdref2, it is determined that there is a temporary request to execute the catalyst degradation suppression control (step S180).

Then, the unexecuted percentage Rr of the catalyst degradation suppression control is compared to a threshold value Rref (step S190), and the power storage percentage SOC of the battery 50 is compared with a threshold value Sref and the charge-discharge current Ib of the battery 50 is compared to a value of 0 (step S200). Then the vehicle speed V is compared to a threshold value Vref and the cumulative air amount Ga is compared to a threshold value Gref (step S210). Here, the threshold value Rref is used to determine whether a request to execute the catalyst degradation suppression control (either a real request or a temporary request for this execution) is being responded to adequately. For example, 5% or 10% or the like, may be used as the threshold value Rref. Also, the threshold value Sref is used to determine whether the battery 50 is relatively close to being fully charged, and is set as a power storage percentage SOC that is slightly less than fully charged. For example, the power storage percentage SOC that is a predetermined percentage (such as 80% or 90% or the like) of fully charged, or a power storage percentage SOC that is less than fully charged by a predetermined value (such as 10% or 15% or the like), may be used. Step S200 is a step for determining whether the battery 50 is charging in a state relatively close to fully charged, i.e., whether it can be assumed that the battery 50 will be fully charged. Furthermore, the threshold value Vref and the threshold value Gref are used to determine whether the current running state is a temperature increasing running state that is set as a running state in which the catalyst temperature Tc tends to increase to equal to or greater than the threshold value Tcdref1. For example, 130 km/h or 150 km/h or the like may be used as the threshold value Vref, and 8,000 g or 10,000 g or the like may be used as the threshold value Gref, for example.

If the unexecuted percentage Rr of the catalyst degradation suppression control is equal to or greater than the threshold value Rref in step S190, it is determined that the request to execute the catalyst degradation suppression control is not being responded to adequately. If the power storage percentage SOC of the battery 50 is equal to or greater than the threshold value Sref and the charge-discharge current Ib of the battery 50 is less than a value of 0 (i.e., the battery 50 is charging) in step S200, it is determined that the battery 50 is assumed to be fully charged. If the vehicle speed V is equal to or greater than the threshold value Vref and the cumulative air amount Ga is equal to or greater than the threshold value Gref in step S210, it is determined that the current running state is the temperature increasing running state. In these cases, a command to execute the catalyst degradation suppression control is output to the engine ECU 24 (step S150). Then the torque commands Tm1* and Tm2* of the motors MG1 and MG2 are set, and the brake torque command Tb* is set, and these are output to the motor ECU 40 and the brake ECU 94, respectively (steps S160, and S260 to S280). Then this cycle of the routine ends. That is, with the engine 22, the catalyst degradation suppression control is executed when the unexecuted percentage Rr of the catalyst degradation suppression control is equal to or greater than the threshold value Rref, as well as when the power storage percentage SOC of the battery 50 is equal to or greater than the threshold value Sref and the battery 50 is charging, and when the vehicle speed V is equal to or greater than the threshold value Vref and the cumulative air amount Ga is equal to or greater than the threshold value Gref, when the catalyst temperature Tc is less than the threshold value Tcdref1 and equal to or greater than the threshold value Tcdref2 (i.e., when there is a temporary request to execute the catalyst degradation suppression control), in addition to when the catalyst temperature Tc is equal to or greater than the threshold value Tcdref1 (i.e., when there is a real request to execute the catalyst degradation suppression control). This enables there to be opportunities to execute the catalyst degradation suppression control, so promotion of degradation of the exhaust gas control catalyst 134a can be even further suppressed.

On the other hand, if in steps S190 to S210 the unexecuted percentage Rr of the catalyst degradation suppression control is less than the threshold value Rref and the power storage percentage SOC of the battery 50 is less than the threshold value Sref or the charge-discharge current Ib of the battery 50 is equal to or greater than a value of 0 (i.e., if the battery 50 is not charging), and if the vehicle speed V is less than the threshold value Vref or the cumulative air amount Ga is less than the threshold value Gref, a request to execute the catalyst degradation suppression control is being responded to adequately, so it is not assumed that the battery 50 will be fully charged and it is determined that the current running state is not the temperature increasing running state, so the value of the catalytic smell suppression request flag Fs is checked (step S220).

If the catalytic smell suppression request flag Fs is a value of 0, it is determined that there is not a request to execute catalytic smell suppression control that is control of the engine 22 to suppress a catalytic smell of the exhaust gas control catalyst 134*a*, so a command to execute normal fuel cut control is output to the engine ECU 24 (step S240). Then a value of 0 is set for the torque command Tm1* of the motor MG1 (step S250), the torque command Tm2 of the motor MG2 is set (steps S260 to S264), and the brake torque command Tb* is set (step S270). Then the torque commands Tm1* and Tm2* of the motors MG1 and MG2 are output to the motor ECU 40, and the brake torque command Tb* is output to the brake ECU 94 (step S280), after which this cycle of the routine ends. Upon receiving the command to execute normal fuel cut control, the engine ECU 24 stops fuel injection control in the engine 22. In this case, the engine 22 in which fuel injection has been stopped may be motored by the motor MG1, and braking torque may be applied to the ring gear shaft 32*a*. Hereinafter, this braking torque will be referred to as an "engine brake." Also, when an engine brake is applied to the ring gear shaft 32*a*, the torque that is the difference between the required braking torque Tr* and the engine brake may be covered (i.e., provided) by the torque output from the motor MG2 and the torque in which the braking force from the brake wheel cylinders 96*a* to 96*d* has been converted to a value at the ring gear shaft 32*a* (hereinafter, referred to as "hydraulic braking force converted torque").

On the other hand, if the catalytic smell suppression request flag Fs is a value of 1 in step S220, it is determined that there is a request to execute the catalytic smell suppression control, so a command to execute the catalytic smell suppression control is output to the engine ECU 24 (step S230). Then the torque commands Tm1* and Tm2* of the motors MG1 and MG2 are set and the brake torque command Tb* is set, and these are output to the motor ECU 40 and the brake ECU 94, respectively (steps S250 to 280). Then this cycle of the routine ends. Upon receiving the command to execute the catalytic smell suppression control, the engine ECU 24 stops the fuel injection control in the engine 22, and performs intake air amount control such that the intake air amount Qa will become larger than it is when normal fuel cut control is performed. As a result of this control, air, not exhaust gas after the air-fuel mixture is combusted, flows to the exhaust gas control catalyst 134*a*, so the exhaust gas control catalyst 134*a* is able to be inhibited from being exposed to a rich atmosphere, such that a catalytic smell of the exhaust gas control catalyst 134*a* is able to be suppressed. Moreover, in this case, controlling the engine 22 such that the intake air amount Qa becomes larger than it does when normal fuel cut control is performed enables the exhaust gas control catalyst 134*a* to be exposed to a lean atmosphere (no longer exposed to a rich atmosphere) more quickly.

If the catalyst temperature Tc is less than the threshold value Tcdref2 in step S170, it is determined that there is neither a real request nor a temporary request to execute the catalyst degradation suppression control, so the value of the catalytic smell suppression request flag Fs is checked (step S220). If the catalytic smell suppression request flag Fs is a value of 0, a command to execute normal fuel cut control is output to the engine ECU 24 (step S240). If the catalytic smell suppression request flag Fs is a value of 1, a command to execute the catalytic smell suppression control is output to the engine ECU 24 (step S230). Then, the torque commands Tm1* and Tm2* of the motors MG1 and MG2 are set and the brake torque command Tb* is set, and these are output to the motor ECU 40 and the brake ECU 94, respectively (steps S250 to S280). Then this cycle of the routine ends. As a result, it is possible to suppress a catalytic smell of the exhaust gas control catalyst 134*a* when the catalytic smell producing condition is satisfied.

If it is determined that the battery 50 is fully charged in step S120, the value of the catalytic smell suppression request flag Fs is checked (step S220). If the catalytic smell suppression request flag Fs is a value of 0, a command to execute normal fuel cut control is output to the engine ECU 24 (step S240). If the catalytic smell suppression request flag Fs is a value of 1, a command to execute the catalytic smell suppression control is output to the engine ECU 24 (step S230). Then, the torque commands Tm1* and Tm2* of the motors MG1 and MG2 are set and the brake torque command Tb* is set, and these are output to the motor ECU 40 and the brake ECU 94, respectively (steps S250 to S280). Then this cycle of the routine ends. That is, when the battery 50 is fully charged, the catalyst degradation suppression control will not be executed, regardless of the catalyst temperature Tc. As described above, when the catalyst degradation suppression control is executed, torque for adjusting the engine speed Ne of the engine 22 may be output from the motor MG1, and if this torque is torque in the direction that reduces the engine speed Ne of the engine 22, electric power will be generated by the motor MG1. When the battery 50 is fully charged, it is preferable that electric power not be generated by the motor MG1 in this way, so in this first example embodiment, the catalyst degradation suppression control is not executed. Therefore, the battery 50 can be protected. In this case, it is also preferable that the motor MG2 not be regeneratively driven, so the required braking torque Tr* may be covered by the hydraulic braking force converted torque, or by the engine brake and the hydraulic braking force converted torque.

According to the hybrid vehicle 20 in the first example embodiment described above, catalyst degradation suppression control is executed when the unexecuted percentage Rr of the catalyst degradation suppression control that controls the engine 22 to operate with fuel injection being performed is equal to or greater than the threshold value Rref, as well as when the power storage percentage SOC of the battery 50 is equal to or greater than the threshold value Sref and the battery 50 is charging, and when the vehicle speed V is equal to or greater than the threshold value Vref and the cumulative air amount Ga is equal to or greater than the threshold value Gref, when the catalyst temperature Tc is less than the threshold value Tcdref1 and equal to or greater than the threshold value Tcdref2, in addition to when the catalyst temperature Tc is equal to or greater than the threshold value Tcdref1, when there is a predetermined braking request in which there is a braking request while the vehicle is running while the engine 22 is operating. This enables there to be more opportunities to execute the catalyst degradation suppression control, so degradation of the exhaust gas control catalyst 134*a* can be even further suppressed from being promoted.

With the hybrid vehicle 20 in the first example embodiment, it is determined whether to execute the catalyst degradation suppression control or whether to execute other control (i.e., catalytic smell suppression control or normal fuel cut control) using the unexecuted percentage Rr of the catalyst degradation suppression control, the power storage percentage SOC and the charge-discharge current Ib of the battery 50, the vehicle speed V, and the cumulative air amount Ga, when the catalyst temperature Tc is less than the threshold value Tcdref1 and equal to or greater than the threshold value Tcdref2. Alternatively, however, the determination of whether to execute the catalyst degradation suppression control or whether to execute other control may also be made without using some of these. For example, the determination of whether to execute the catalyst degradation suppression control or whether to execute other control may be made using only the unexecuted percentage Rr of the catalyst degradation suppression control, without taking into account the power storage percentage SOC and the charge-discharge current Ib of the battery 50, the vehicle speed V, and the cumulative air amount Ga. Also, the determination of whether to execute the catalyst degradation suppression control or whether to execute other control may be made using only the power storage percentage SOC and the charge-discharge current Ib of the battery 50, without taking into account the unexecuted percentage Rr of the catalyst degradation suppression control, the vehicle speed V, and the cumulative air amount Ga. Also, the determination of whether to execute the catalyst degradation suppression control or whether to execute other control may be made using only the vehicle speed V and the cumulative air amount Ga, without taking into account the unexecuted percentage Rr of the catalyst degradation suppression control, and the power storage percentage SOC and the charge-discharge current Ib of the battery 50. Also, in the determination of whether to execute the catalyst degradation suppression control or whether to execute other control, the unexecuted time as the period of time that the catalyst degradation suppression control is not executed even though there is a request to execute the catalyst degradation suppression control when there is a predetermined braking request, or the number of unexecuted times as the number of times that the catalyst degradation suppression control is not executed even though there is a request to execute the catalyst degradation suppression control when there is a predetermined braking request, or the like may be used instead of or in addition to the unexecuted percentage Rr in step S190 that uses the unexecuted percentage Rr as the percentage of the time that the catalyst degradation suppression control is not executed out of the time that there is a request to execute the catalyst degradation suppression control (either a real request or a temporary request for this execution) when there is a predetermined braking request. Furthermore, in the determination of whether to execute the catalyst degradation suppression control or whether to execute other control, only the power storage percentage SOC of the battery 50 may be used, without using the charge-discharge current Ib of the battery 50, in step S200 that uses the power storage percentage SOC and the charge-discharge current Ib of the battery 50. Alternatively, in the determination of whether to execute the catalyst degradation suppression control or whether to execute other control, only the vehicle speed V may be used, without using the cumulative air amount Ga, in step S210 that uses the vehicle speed V and the cumulative air amount Ga.

Next, a hybrid vehicle 20B as a second example embodiment of the invention will be described. The hybrid vehicle 20B according to this second example embodiment has the same hardware structure as the hybrid vehicle 20 in the first example embodiment described with reference to FIG. 1. Therefore, to avoid redundant descriptions, a detailed description of the hardware structure of the hybrid vehicle 20B of the second example embodiment will be omitted.

Figure 6:
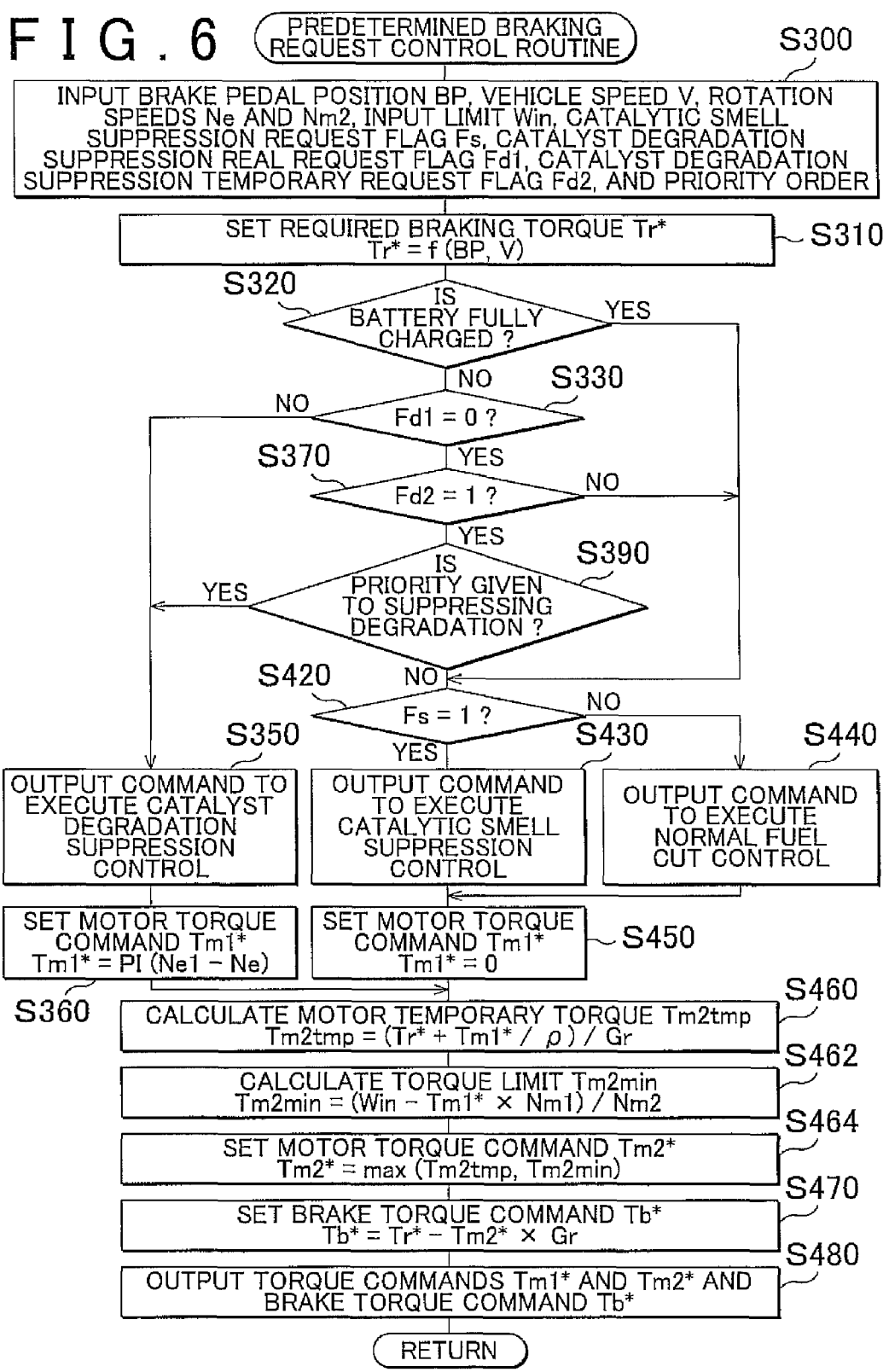
FIG. 6 is a flowchart illustrating an example of a predetermined braking request control routine executed by a hybrid electronic control unit according to a second example embodiment of the invention.

With the hybrid vehicle 20B of the second example embodiment, the hybrid ECU 70 executes a predetermined braking request control routine illustrated in FIG. 6 instead of the predetermined braking request control routine in FIGS. 3A and 3B. When the predetermined braking request control routine in FIG. 6 is executed, the CPU 72 of the hybrid ECU 70 first executes a step to input data such as the brake pedal position BP, the vehicle speed V, the engine speed Ne of the engine 22, the rotation speed Nm2 of the motor MG2, the input limit Win of the battery 50, the catalytic smell suppression request flag Fs, a catalyst degradation suppression real request flag Fd1 indicative of whether there is a real request to execute the catalyst degradation suppression control, a catalyst degradation suppression temporary request flag Fd2 indicative of whether there is a temporary request to execute the catalyst degradation suppression control, and a priority order of the catalyst degradation suppression control and other control (i.e., catalytic smell suppression control or normal fuel cut control, in this second example embodiment), and the like (step S300). Here, the brake pedal position BP, the vehicle speed V, the engine speed Ne of the engine 22, the rotation speed Nm2 of the motor MG2, the input limit Win of the battery 50, and the catalytic smell suppression request flag Fs are input just as they are in step S100 in the predetermined braking request control routine in FIG. 3A. Also, the catalyst degradation suppression real request flag Fd1 is a flag that is set to a value of 0 when it is determined that there is not a real request to execute the catalyst degradation suppression control when the catalyst temperature Tc is less than the threshold value Tcdref1, and is set to a value of 1 when it is determined that there is a real request to execute the catalyst degradation suppression control when the catalyst temperature Tc is equal to or greater than the threshold value Tcdref1. The catalyst degradation suppression temporary request flag Fd2 is a flag that is set to a value of 0 when it is determined that there is not a temporary request to execute the catalyst degradation suppression control when the catalyst temperature Tc is less than the threshold value Tcdref2 or equal to or greater than the threshold value Tcdref1, and is set to a value of 1 when it is determined that there is a temporary request to execute the catalyst degradation suppression control when the catalyst temperature Tc is equal to or greater than the threshold value Tcdref2 and less than the threshold value Tcdref1. These flags that are set by a catalyst degradation suppression request flag setting routine, not shown, that is executed by the engine ECU 24 are input from the engine ECU 24 via communication. Moreover, the priority order of the catalyst degradation suppression control and the other control is input by reading the order set by a priority order setting routine in FIG. 7 that is executed by the hybrid ECU 70. At this time, the description of the predetermined braking request control routine in FIG. 6 will be temporarily interrupted to describe the priority order setting routine in FIG. 7.

Figure 7:
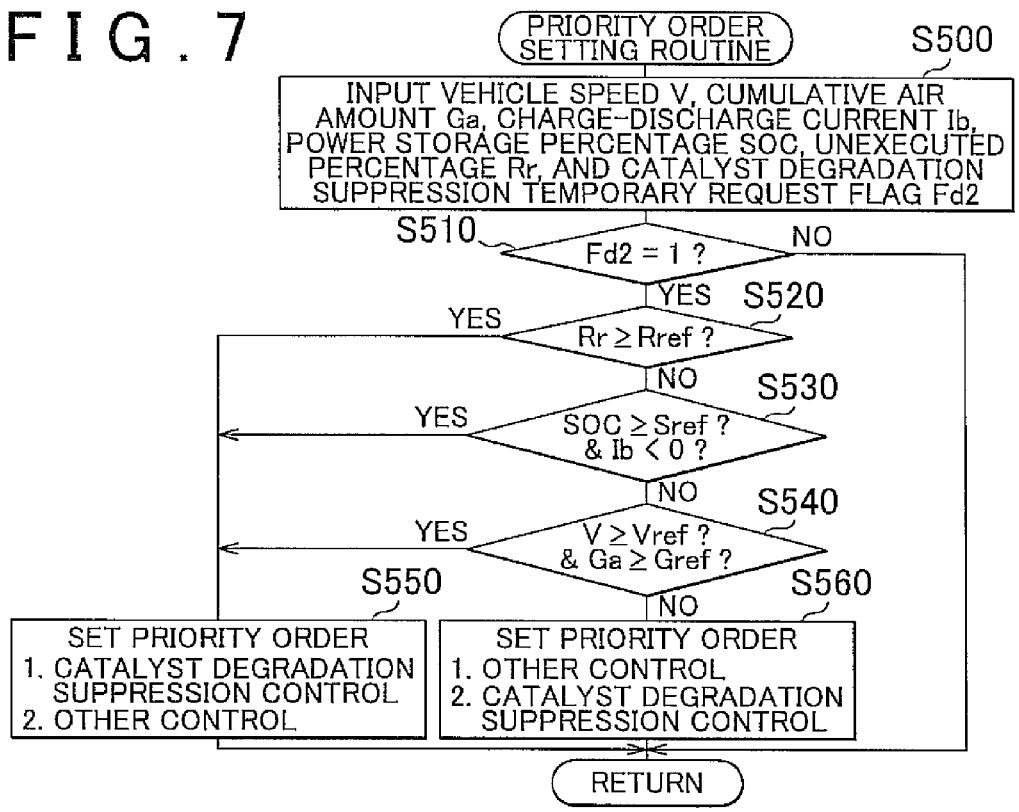
FIG. 7 is a flowchart illustrating a priority order setting routine executed by the hybrid electronic control unit according to the second example embodiment.

When the priority order setting routine of FIG. 7 is executed, the CPU 72 of the hybrid ECU 70 first executes a step to input data such as the vehicle speed V, the cumulative air amount Ga, the charge-discharge current Ib of the battery 50, the power storage percentage SOC of the battery 50, the unexecuted percentage Rr of the catalyst degradation suppression control, and the catalyst degradation suppression temporary request flag Fd2, and the like (step S500). Here, the vehicle speed V, the cumulative air amount Ga, the charge-discharge current Ib of the battery 50, the power storage percentage SOC of the battery 50, and the unexecuted percentage Rr of the catalyst degradation suppression control are input just as they are in step S100 of the predetermined braking request control routine in FIG. 3A. Also, the catalyst degradation suppression temporary request flag Fd2 is input just as it is in step S100 of the predetermined braking request control routine in FIG. 6.

When the data is input in this way, the value of the input catalyst degradation suppression temporary request flag Fd2 is checked (step S510). If the catalyst degradation suppression temporary request flag Fd2 is a value of 0, it is determined that there is not a temporary request to execute the catalyst degradation suppression control, and this cycle of the routine immediately ends.

If, on the other hand, the catalyst degradation suppression temporary request flag Fd2 is a value of 1, it is determined that there is a temporary request to execute the catalyst degradation suppression control, and the unexecuted percentage Rr of the catalyst degradation suppression control is compared to the threshold value Rref (step S520), the power storage percentage SOC of the battery 50 is compared to the threshold value Sref and the charge-discharge current Ib of the battery 50 is compared to a value of 0 (step S530), and the vehicle speed V is compared to the threshold value Vref and the cumulative air amount Ga is compared to the threshold value Gref (step S540).

If the unexecuted percentage Rr of the catalyst degradation suppression control is equal to or greater than the threshold value Rref, or if the power storage percentage SOC of the battery 50 is equal to or greater than the threshold value Sref and the charge-discharge current Ib of the battery 50 is less than a value of 0 (i.e., the battery 50 is charging), or if the vehicle speed V is equal to or greater than the threshold value Vref and the cumulative air amount Ga is equal to or greater than the threshold value Gref, the priority order of the control of the engine 22 is set to the order of 1) catalyst degradation suppression control and 2) other control (i.e., catalytic smell suppression control or normal fuel cut control) (step S550), and then this cycle of the routine ends. If the unexecuted percentage Rr of the catalyst degradation suppression control is less than the threshold value Rref, and the power storage percentage SOC of the battery 50 is less than the threshold value Sref or the charge-discharge current Ib of the battery 50 is equal to or greater than a value of 0 (i.e., the battery 50 is not charging), and the vehicle speed V is less than the threshold value Vref or the cumulative air amount Ga is less than the threshold value Gref, the priority order of the control of the engine 22 is set to the order of 1) other control and 2) the catalyst degradation suppression control (step S560), and then this cycle of the routine ends.

Returning now to the description of the predetermined braking request control routine in FIG. 6, when data is input in step S300, the required braking torque Tr* is set using the required braking torque setting map in FIG. 4 described above, based on the input brake pedal position BP and vehicle speed V (step S310). Then it is determined whether the battery 50 is fully charged (step S320). If it is determined that the battery 50 is not fully charged, the value of the catalyst degradation suppression real request flag Fd1 is checked (step S330). If the catalyst degradation suppression real request flag Fd1 is a value of 1, it is determined that there is a real request to execute the catalyst degradation suppression control, so a command to execute the catalyst degradation suppression control is output to the engine ECU 24 (step S350). Then the torque commands Tm1* and Tm2* of the motors MG1 and MG2 are set and the brake torque command Tb* is set, just as they are in steps S160 and S260 to S280 in the predetermined braking request control routine in FIG. 3B, and these are output to the motor ECU 40 and the brake ECU 94, respectively (steps S360 and S460 to S480). Then this cycle of the routine ends. As a result, it is possible to suppress degradation of the exhaust gas control catalyst 134a from being promoted.

If the catalyst degradation suppression real request flag Fd1 is a value of 0 in step S330, it is determined that there is not a real request to execute the catalyst degradation suppression control, so the value of the catalyst degradation suppression temporary request flag Fd2 is checked (step S370). If the catalyst degradation suppression temporary request flag Fd2 is a value of 1, it is determined that there is a temporary request to execute the catalyst degradation suppression control, so the priority order of the catalyst degradation suppression control and the other control (i.e., catalytic smell suppression control or normal fuel cut control) is checked (step S390).

If the priority order is that of 1) the catalyst degradation suppression control and 2) the other control, a command to execute the catalyst degradation suppression control is output to the engine ECU 24 (step S350). Then the torque commands Tm1* and Tm2* of the motors MG1 and MG2 are set and the brake torque command Tb* is set, and these are output to the motor ECU 40 and the brake ECU 94, respectively (steps S360 and S460 to S480). Then this cycle of the routine ends. On the other hand, if the priority order is that of 1) the other control and 2) the catalyst degradation suppression control, the value of the catalytic smell suppression request flag Fs is checked (step S420). If the catalytic smell suppression request flag Fs is a value of 0, it is determined that there is not a request to execute the catalytic smell suppression control, so a command to execute normal fuel cut control is output to the engine ECU 24 (step S440). If the catalytic smell suppression request flag Fs is a value of 1, it is determined that there is a request to execute the catalytic smell suppression control, so a command to execute the catalytic smell suppression control is output to the engine ECU 24 (step S430). Then the torque commands Tm1* and Tm2* of the motors MG1 and MG2 are set and the brake torque command Tb* is set, and these are output to the motor ECU 40 and the brake ECU 94, respectively (steps S450 to S480). Then this cycle of the routine ends. That is, when there is a temporary request to execute the catalyst degradation suppression control and a request to execute the catalytic smell suppression control (i.e., when the catalyst degradation suppression temporary request flag Fd2 and the catalytic smell suppression request flag Fs are both a value of 1), the catalyst degradation suppression control or the catalytic smell suppression control is executed according to the priority order of the catalyst degradation suppression control and the other control. When there is a temporary request to execute the catalyst degradation suppression control but there is not a request to execute the catalytic smell suppression control (i.e., when the catalyst degradation suppression temporary request flag Fd2 is a value of 1 and the catalytic smell suppression request flag Fs is a value of 0), the catalyst degradation suppression control or normal fuel cut control is executed according to the priority order of the catalyst degradation suppression control and the other control. Therefore, when there is both a temporary request to execute the catalyst degradation suppression control and a request to execute the catalytic smell suppression control, there are able to be more opportunities to execute the catalytic smell suppression control than there are when the catalyst degradation suppression control is executed irrespective of other requirements, and there are able to be more opportunities to execute the catalyst degradation suppression control than there are when the catalytic smell suppression control is executed irrespective of other requirements. As a result, it is possible to more appropriately suppress both the promotion of degradation of the exhaust gas control catalyst 134*a* and the catalytic smell of the exhaust gas control catalyst 134*a*.

When it is determined that the battery 50 is fully charged in step S320, as well as when the catalyst degradation suppression temporary request flag Fd2 is a value of 0 in step S370, the value of the catalytic smell suppression request flag Fs is checked (step S420). If the catalytic smell suppression request flag Fs is a value of 0, a command to execute normal fuel cut control is output to the engine ECU 24 (step S440). If the catalytic smell suppression request flag Fs is a value of 1, a command to execute the catalytic smell suppression control is output to the engine ECU 24 (step S430). Then the torque commands Tm1\* and Tm2\* of the motors MG1 and MG2 are set and the brake torque command Tb\* is set, and these are output to the motor ECU 40 and the brake ECU 94, respectively (steps S450 to S480). Then this cycle of the routine ends. As a result, it is possible to suppress the catalytic smell of the exhaust gas control catalyst 134*a* when the catalytic smell producing condition is satisfied, and protect the battery 50 when the battery 50 is fully charged.

According to the hybrid vehicle 20B of the second example embodiment described above, when there is a predetermined braking request in which there is a braking request while the hybrid vehicle is running with the engine 22 operating, catalyst degradation suppression control is executed for the engine 22 when there is a real request to execute the catalyst degradation suppression control, and the priority order of the catalyst degradation suppression control and the other control (in this case, catalytic smell suppression control) is set using the unexecuted percentage Rr of the catalyst degradation suppression control, the power storage percentage SOC and the charge-discharge current Ib of the battery 50, and the vehicle speed V and the cumulative air amount Ga, when there is a temporary request to execute the catalyst degradation suppression control and there is a request to execute the catalytic smell suppression control, even if there is not a real request to execute the catalyst degradation suppression control. When the priority order is 1) the catalyst degradation suppression control and 2) the other control, the catalyst degradation suppression control is executed for the engine 22 preferentially over the other control, so there are more opportunities to execute the catalyst degradation suppression control. As a result, degradation of the exhaust gas control catalyst 134*a* can be even further suppressed from being promoted.

With the hybrid vehicle 20B in this second example embodiment, the priority order of 1) the catalyst degradation suppression control and 2) the other control (i.e., the catalytic smell suppression control when the catalytic smell suppression request flag Fs is a value of 1, and normal fuel cut control when the catalytic smell suppression request flag Fs is a value of 0) is set using the unexecuted percentage Rr of the catalyst degradation suppression control, the power storage percentage SOC and the charge-discharge current Ib of the battery 50, and the vehicle speed V and the cumulative air amount Ga. Alternatively, however, the priority order of the catalyst degradation suppression control and the other control may be set without using some of these. For example, the priority order of the catalyst degradation suppression control and the other control may be set using only the unexecuted percentage Rr of the catalyst degradation suppression control, without taking into account the power storage percentage SOC and the charge-discharge current Ib of the battery 50, the vehicle speed V, and the cumulative air amount Ga. Alternatively, the priority order of the catalyst degradation suppression control and the other control may be set using only the power storage percentage SOC and the charge-discharge current Ib of the battery 50, without taking into account the unexecuted percentage Rr of the catalyst degradation suppression control, the vehicle speed V and the cumulative air amount Ga. Or, the priority order of the catalyst degradation suppression control and the other control may be set using only the vehicle speed V and the cumulative air amount Ga, without taking into account the unexecuted percentage Rr of the catalyst degradation suppression control, and the power storage percentage SOC and the charge-discharge current Ib of the battery 50. Also, in setting the priority order of the catalyst degradation suppression control and the other control, the unexecuted time or the number of unexecuted times or the like described above may be used instead of the unexecuted percentage Rr in step S520 that uses the unexecuted percentage Rr. Moreover, in setting the priority order of the catalyst degradation suppression control and the other control, only the power storage percentage SOC of the battery 50 may be used, without using the charge-discharge current Ib of the battery 50, in step S530 that uses the power storage percentage SOC and the charge-discharge current Ib of the battery 50. Alternatively, in setting the priority order of the catalyst degradation suppression control and the other control, only the vehicle speed V may be used, without using the cumulative air amount Ga, in step S540 that uses the vehicle speed V and the cumulative air amount Ga.

With the hybrid vehicles 20 and 20B of the first and second example embodiments, the catalyst degradation suppression control controls the engine 22 so that the engine 22 operates on its own at the predetermined engine speed Ne1. However, it is sufficient that the catalyst degradation suppression control controls the engine 22 so that the engine 22 operates with fuel injection being performed. For example, the catalyst degradation suppression control may also control the engine 22 such that a small amount of torque is output from the engine 22. In this case, the motor MG1 may be controlled to generate electric power using torque from the engine 22 in order to suppress overspeeding (i.e., racing) of the engine 22.

With the hybrid vehicles 20 and 20B of the first and second example embodiments, when the battery 50 is fully charged, the catalyst degradation suppression control is not executed for the engine 22. Instead the catalytic smell suppression control or normal fuel cut control is executed for the engine 22, and the motor MG1 is controlled so as not to output torque. Alternatively, however, even when the battery 50 is fully charged, the catalyst degradation suppression control may be executed when necessary when the motor MG1 is controlled so as to not output generated torque (i.e., such that the battery 50 will not be charged).

With the hybrid vehicles 20 and 20B of the first and second example embodiments, when the catalytic smell suppression control is executed for the engine 22, fuel injection control of the engine 22 is stopped and intake air amount control is performed such that the intake air amount Qa becomes greater than it is when normal fuel cut control is performed, but the same control may also be performed when normal fuel cut control is performed.

Figure 8:
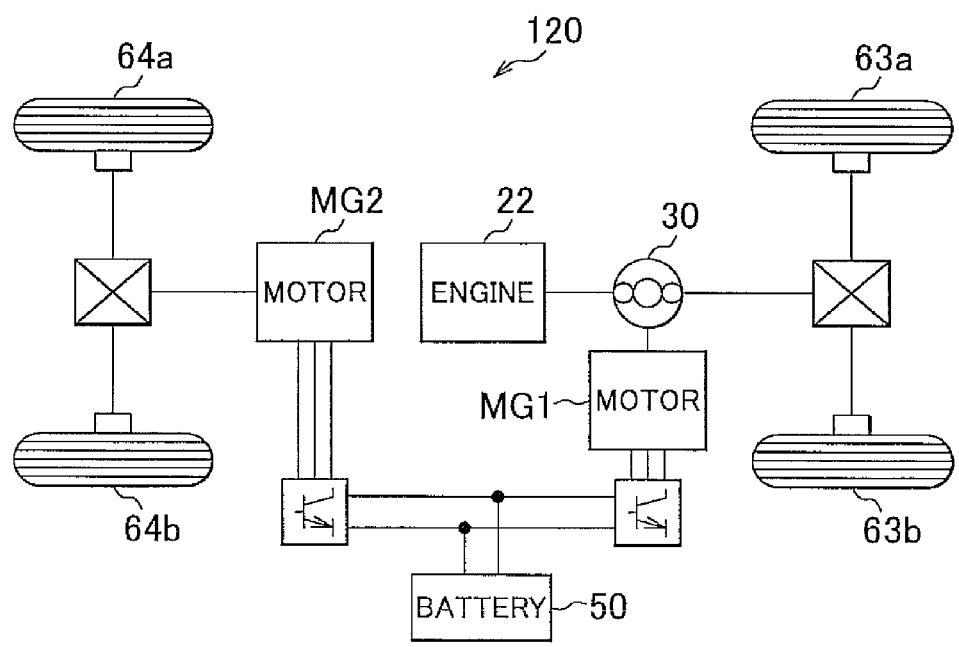
FIG. 8 is a block diagram schematically showing the structure of a hybrid vehicle according to a first modified example of the first and second example embodiments.

With the hybrid vehicles 20 and 20B of the first and second example embodiments, power from the motor MG2 is output to the ring gear shaft 32*a* after being changed by the reduction gear 35. Alternatively, however, as illustrated with a hybrid vehicle 120 according to a first modified example shown in FIG. 8, power from the motor MG2 may be output to shaft (i.e., a shaft connected to wheels 64*a* and 64*b* in FIG. 8) that is different from the shaft that is connected to the ring gear shaft 32*a* (i.e., that is different from the shaft that is connected to the driving wheels 63*a* and 63*b*).

With the hybrid vehicles 20 and 20B of the first and second example embodiments, power from the engine 22 is output via the power splitting/combining device 30 to the ring gear shaft 32a that serves as the drive shaft that is connected to the driving wheels 63a and 63b, and power from the motor MG2 is output via the reduction gear 35 to the ring gear shaft 32a. Alternatively, as illustrated with a hybrid vehicle 220 according to a second modified example shown in FIG. 9, a motor MG may be attached via a transmission 230 to a drive shaft that is connected to the driving wheels 63a and 63b, and the engine 22 may be connected to a rotating shaft of the motor MG via a clutch 229. Power from the engine 22 may be output to the drive shaft via the rotating shaft of the motor MG and the transmission 230, and power from the motor MG may be output to the drive shaft via the transmission 230. Also, as illustrated with a hybrid vehicle 320 according to a third modified example shown in FIG. 10, power from the engine 22 may be output via a transmission 330 to an axle that is connected to the driving wheels 63a and 63b, and power from the motor MG may be output to an axle that is different from the axle to which the driving wheels 63a and 63b are connected (i.e., output to an axle that is connected to the wheels 64a and 64b in FIG. 10). That is, the type of hybrid vehicle is not limited as long as it is provided with an internal combustion engine that outputs power for running and an electric motor that inputs and outputs power for running.

In the first and second example embodiments, the engine 22 in which the exhaust gas control apparatus 134 that has the exhaust gas control catalyst 134a is provided in the exhaust system is one example of the internal combustion engine, the motor MG2 is one example of the electric motor, and the battery 50 is one example of the secondary battery.

Further, i) the hybrid ECU 70 that executes the predetermined braking request control routine in FIGS. 3A and 3B that outputs a command to execute catalyst degradation suppression control that controls the engine to operate with fuel injection being performed to the engine ECU 24, sets the torque command Tm2* of the motor MG2 based on the required braking torque Tr*, and outputs it to the motor ECU 40, when the catalyst temperature Tc is equal to or greater than the threshold value Tcdref1, as well as when the catalyst temperature Tc is less than the threshold value Tcdref1 and equal to or greater than the threshold value Tcdref2 and the power storage percentage SOC of the battery 50 is equal to or greater than the threshold value Sref and the battery 50 is charging, when there is a predetermined braking request, ii) the engine ECU 24 that controls the engine 22 such that the engine 22 operates on its own at the predetermined engine speed Ne1 as the catalyst degradation suppression control upon receiving the command to execute the catalyst degradation suppression control, and iii) the motor ECU 40 that controls the motor MG2 based on the received torque command Tm2* of the motor MG2, are examples of the controller. Also, i) the hybrid ECU 70 that executes the predetermined braking request control routine in FIGS. 3A and 3B that outputs a command to execute the catalyst degradation suppression control to the engine ECU 24, sets the torque command Tm2* of the motor MG2 based on the required braking torque Tr*, and outputs it to the motor ECU 40, when the catalyst temperature Tc is equal to or greater than the threshold value Tcdref1, as well as when the catalyst temperature Tc is less than the threshold value Tcdref1 and equal to or greater than the threshold value Tcdref2 and the vehicle speed V is equal to or greater than the threshold value Vref and the cumulative air amount Ga is equal to or greater than the threshold value Gref, when there is a predetermined braking request, ii) the engine ECU 24 that executes the catalyst degradation suppression control upon receiving the command to execute the catalyst degradation suppression control, and iii) the motor ECU 40 that controls the motor MG2 based on the received torque command Tm2* of the motor MG2, are examples of the controller. Further, i) the hybrid ECU 70 that executes the predetermined braking request control routine in FIGS. 3A and 3B that outputs a command to execute the catalyst degradation suppression control to the engine ECU 24, sets the torque command Tm2* of the motor MG2 based on the required braking torque Tr*, and outputs it to the motor ECU 40, when the catalyst temperature Tc is equal to or greater than the threshold value Tcdref1, as well as when the catalyst temperature Tc is less than the threshold value Tcdref1 and equal to or greater than the threshold value Tcdref2 and the unexecuted percentage Rr of the catalyst degradation suppression control is equal to or greater than the threshold value Rref, when there is a predetermined braking request, ii) the engine ECU 24 that executes the catalyst degradation suppression control upon receiving the command to execute the catalyst degradation suppression control, and iii) the motor ECU 40 that controls the motor MG2 based on the received torque command Tm2* of the motor MG2, are examples of the controller.

Also, i) the hybrid ECU 70 that executes the priority order setting routine in FIG. 7 that sets the priority order of the catalyst degradation suppression control and other control (i.e., the catalytic smell suppression control or normal fuel cut control) using the power storage percentage SOC and the charge-discharge current Ib of the battery 50, and executes the predetermined braking request control routine in FIG. 6 that outputs a command to execute the catalyst degradation suppression control to the engine ECU 24, sets the torque command Tm2* of the motor MG2 based on the required braking torque Tr*, and outputs it to the motor ECU 40, when there is a real request to execute the catalyst degradation suppression control, as well as when there is a temporary request to execute the catalyst degradation suppression control and the priority order of the catalyst degradation suppression control and the other control is 1) the catalyst degradation suppression control and 2) the other control, when there is a predetermined braking request, ii) the engine ECU 24 that executes the catalyst degradation suppression control upon receiving the command to execute the catalyst degradation suppression control, and iii) the motor ECU 40 that controls the motor MG2 based on the received torque command Tm2* of the motor MG2, are examples of the controller.

Further, i) the hybrid ECU 70 that executes the priority order setting routine in FIG. 7 that sets the priority order of the catalyst degradation suppression control and other control using the vehicle speed V and the cumulative air amount Ga, and executes the predetermined braking request control routine in FIG. 6 that outputs a command to execute the catalyst degradation suppression control to the engine ECU 24, sets the torque command Tm2* of the motor MG2 based on the required braking torque Tr*, and outputs it to the motor ECU 40, when there is a real request to execute the catalyst degradation suppression control, as well as when there is a temporary request to execute the catalyst degradation suppression control and the priority order of the catalyst degradation suppression control and the other control is 1) the catalyst degradation suppression control and 2) the other control, when there is a predetermined braking request, ii) the engine ECU 24 that executes the catalyst degradation suppression control upon receiving the command to execute the catalyst degradation suppression control, and iii) the motor ECU 40 that controls the motor MG2 based on the received torque command Tm2* of the motor MG2, are examples of the controller. Also, i) the hybrid ECU 70 that executes the priority order setting routine in FIG. 7 that sets the priority order of the catalyst degradation suppression control and other control using the unexecuted percentage Rr of the catalyst degradation suppression control, and executes the predetermined braking request control routine in FIG. 6 that outputs a command to execute the catalyst degradation suppression control to the engine ECU 24, sets the torque command Tm2* of the motor MG2 based on the required braking torque Tr*, and outputs it to the motor ECU 40, when there is a real request to execute the catalyst degradation suppression control, as well as when there is a temporary request to execute the catalyst degradation suppression control and the priority order of the catalyst degradation suppression control and the other control is 1) the catalyst degradation suppression control and 2) the other control, when there is a predetermined braking request, ii) the engine ECU 24 that executes the catalyst degradation suppression control upon receiving the command to execute the catalyst degradation suppression control, and iii) the motor ECU 40 that controls the motor MG2 based on the received torque command Tm2* of the motor MG2, are examples of the controller.

Here, the internal combustion engine is not limited to an internal combustion engine that outputs power by combusting a hydrocarbon fuel such as gasoline or light oil. That is, any type of internal combustion engine, such as a hydrogen engine, for example, may be used as long as it has an exhaust gas control apparatus with an exhaust gas control catalyst that purifies exhaust gas, provided in the exhaust system and is capable of outputting power for running. The electric motor is not limited to the motor MG2 that is structured as a synchronous motor-generator. That is, any type of electric motor, such as an induction motor, may be used as long as it is capable of inputting and outputting power for running. The secondary battery is not limited to the battery 50 that is structured as a lithium-ion secondary battery. That is, any type of secondary battery, such as a nickel-metal-hydride secondary battery, a nickel-cadmium secondary battery, or a lead battery, may be used as long as it is capable of sending and receiving electric power to and from an electric motor. The controller is not limited to the combination of the hybrid ECU 70, the engine ECU 24, and the motor ECU 40. That is, the controller may also be formed by a single electronic control unit.

The controller is not limited to a device that executes catalyst degradation suppression control that controls the engine 22 such that the engine 22 operates with fuel injection being performed and controls the motor MG2 based on the torque command Tm2* set based on the required braking torque Tr*, when the catalyst temperature Tc is equal to or greater than the threshold value Tcdref1, as well as when the catalyst temperature Tc is less than the threshold value Tcdref1 and equal to or greater than the threshold value Tcdref2 and the power storage percentage SOC of the battery 50 is equal to or greater than the threshold value Sref and the battery 50 is charging, when there is a predetermined braking request. That is, the controller may be any device as long as it executes catalyst degradation suppression control that controls an internal combustion engine to operate with fuel injection being performed and executes regenerative driving control that controls an electric motor to be regeneratively driven, when a temperature of an exhaust gas control catalyst is equal to or greater than a first predetermined temperature set as a lower limit of a temperature range within which it is assumed that degeneration of the exhaust gas control catalyst will be promoted, as well as when the temperature of the exhaust gas control catalyst is less than the first predetermined temperature and equal to or greater than a second predetermined temperature set as a temperature that is lower than the first predetermined temperature and a power storage percentage that is a percentage of an amount of electric power stored in a secondary battery out of a total capacity of the secondary battery is equal to or greater than a predetermined power storage percentage set beforehand, when there is a predetermined braking request in which there is a braking request while the hybrid vehicle is running with the internal combustion engine operating.

Also, the controller is not limited to a device that executes catalyst degradation suppression control that controls the engine 22 to operate with fuel injection being performed and controls the motor MG2 based on the torque command Tm2* set based on the required braking torque Tr*, when the catalyst temperature Tc is equal to or greater than the threshold value Tcdref1, as well as when the catalyst temperature Tc is less than the threshold value Tcdref1 and equal to or greater than the threshold value Tcdref2 and the vehicle speed V is equal to or greater than the threshold value Vref and the cumulative air amount Ga is equal to or greater than the threshold value Gref, when there is a predetermined braking request. That is, the controller may be any device as long as it executes catalyst degradation suppression control that controls an internal combustion engine to operate with fuel injection being performed and executes regenerative driving control that controls an electric motor to be regeneratively driven with fuel injection being, when a temperature of an exhaust gas control catalyst is equal to or greater than a first predetermined temperature set as a lower limit of a temperature range within which it is assumed that degeneration of the exhaust gas control catalyst will be promoted, as well as when the temperature of the exhaust gas control catalyst is less than the first predetermined temperature and equal to or greater than a second predetermined temperature set as a temperature that is lower than the first predetermined temperature and a current running state is a temperature increasing running state set as a running state in which the temperature of the exhaust gas control catalyst tends to increase to equal to or greater than the first predetermined temperature, when there is a predetermined braking request in which there is a braking request while the hybrid vehicle is running with the internal combustion engine operating.

Moreover, the controller is not limited to a device that executes catalyst degradation suppression control that controls the engine 22 to operate with fuel injection being performed and controls the motor MG2 based on the torque command Tm2* set based on the required braking torque Tr*, when the catalyst temperature Tc is equal to or greater than the threshold value Tcdref1, as well as when the catalyst temperature Tc is less than the threshold value Tcdref1 and equal to or greater than the threshold value Tcdref2 and the unexecuted percentage Rr of the catalyst degradation suppression control is equal to or greater than the threshold value Rref, when there is a predetermined braking request. That is, the controller may be any device as long as it determines that there is a request to execute catalyst degradation suppression control that controls an internal combustion engine to operate with fuel injection being performed when a temperature of an exhaust gas control catalyst is equal to or greater than a second predetermined temperature set as a temperature lower than a first predetermined temperature that is set as a lower limit of a temperature range within which it is assumed that degeneration of the exhaust gas control catalyst will be promoted, when there is a predetermined braking request in which there is a braking request while a vehicle is running with an internal combustion engine operating, and executes catalyst degradation suppression control for the internal combustion engine and executes regenerative driving control that controls an electric motor so as to be regeneratively driven, when the temperature of the exhaust gas control catalyst is equal to or greater than the first predetermined temperature, as well as when the temperature of the exhaust gas control catalyst is less than the first predetermined temperature and equal to or greater than the second predetermined temperature and an unexecuted degree, that is a degree to which catalyst degradation suppression control is not executed for the internal combustion engine even though there is a request to execute the catalyst degradation suppression control, is equal to or greater than a predetermined degree set beforehand.

Also, the controller is not limited to a device that sets the priority order of the catalyst degradation suppression control and other control (i.e., catalytic smell suppression control or normal fuel cut control) using the power storage percentage SOC and the charge-discharge current Ib of the battery 50, and executes the catalyst degradation suppression control that controls the engine 22 to operate with fuel injection being performed and controls the motor MG2 based on the torque command Tm2* set based on the required braking torque Tr* when there is a real request to execute the catalyst degradation suppression control, as well as when there is a temporary request to execute the catalyst degradation suppression control and the priority order of the catalyst degradation suppression control and the other control is 1) the catalyst degradation suppression control and 2) the other control, when there is a predetermined braking request. That is, the controller may be any device as long as it preferentially executes catalyst degradation suppression control that controls an internal combustion engine to operate with fuel injection being performed over catalytic smell suppression control that controls the internal combustion engine such that fuel injection is stopped and executes regenerative driving control that controls an electric motor to be regeneratively driven, when a temperature of an exhaust gas control catalyst is equal to or greater than a first predetermined temperature set as a lower limit of a temperature range within which it is assumed that degradation of the exhaust gas control catalyst will be promoted, as well as when the temperature of the exhaust gas control catalyst is less than the first predetermined temperature and equal to or greater than a second predetermined temperature set as a temperature that is lower than the first predetermined temperature and a power storage percentage that is a percentage of an amount of electric power stored in a secondary battery out of a total capacity of the secondary battery is equal to or greater than a predetermined power storage percentage set beforehand, when there is a predetermined braking request in which there is a braking request while a hybrid vehicle is running with an internal combustion engine operating.

Also, the controller is not limited to a device that sets the priority order of the catalyst degradation suppression control and other control (i.e., catalytic smell suppression control or normal fuel cut control) using the vehicle speed V and the cumulative air amount Ga, and executes the catalyst degradation suppression control that controls the engine 22 to operate with fuel injection being performed and controls the motor MG2 based on the torque command Tm2* set based on the required braking torque Tr* when there is a real request to execute the catalyst degradation suppression control, as well as when there is a temporary request to execute the catalyst degradation suppression control and the priority order of the catalyst degradation suppression control and the other control is 1) the catalyst degradation suppression control and 2) the other control, when there is a predetermined braking request.

That is, the controller may be any device as long as it preferentially executes catalyst degradation suppression control that controls an internal combustion engine to operate with fuel injection being performed over catalytic smell suppression control that controls the internal combustion engine such that fuel injection is stopped and executes regenerative driving control that controls an electric motor to be regeneratively driven, when a temperature of an exhaust gas control catalyst is equal to or greater than a first predetermined temperature set as a lower limit of a temperature range within which it is assumed that degradation of the exhaust gas control catalyst will be promoted, as well as when the temperature of the exhaust gas control catalyst is less than the first predetermined temperature and equal to or greater than a second predetermined temperature set as a temperature that is lower than the first predetermined temperature and a current running state is a temperature increasing running state set as a running state in which the temperature of the exhaust gas control catalyst tends to increase to equal to or greater than the first predetermined temperature, when there is a predetermined braking request in which there is a braking request while the hybrid vehicle is running with the internal combustion engine operating.

Further, the controller is not limited to a device that sets the priority order of the catalyst degradation suppression control and the other control (i.e., catalytic smell suppression control or normal fuel cut control) using the unexecuted percentage Rr of the catalyst degradation suppression control, and executes the catalyst degradation suppression control that controls the engine 22 to operate with fuel injection being performed and controls the motor MG2 based on the torque command Tm2* set based on the required braking torque Tr* when there is a real request to execute the catalyst degradation suppression control, as well as when there is a temporary request to execute the catalyst degradation suppression control and the priority order of the catalyst degradation suppression control and the other control is 1) the catalyst degradation suppression control and 2) the other control, when there is a predetermined braking request. That is, the controller may be any device as long as it determines that there is a request to execute catalyst degradation suppression control that controls an internal combustion engine to operate with fuel injection being performed when a temperature of an exhaust gas control catalyst is equal to or greater than a second predetermined temperature set as a temperature that is lower than a first predetermined temperature set as a lower limit of a temperature range within which it is assumed that degeneration of the exhaust gas control catalyst will be promoted, when there is a predetermined braking request in which there is a braking request while the hybrid vehicle is running with the internal combustion engine operating, and preferentially executes the catalyst degradation suppression control over catalytic smell suppression control that controls the internal combustion engine such that fuel injection is stopped and executes regenerative driving control that controls an electric motor to be regeneratively driven when the temperature of the exhaust gas control catalyst is equal to or greater than the first predetermined temperature, as well as when the temperature of the exhaust gas control catalyst is less than the first predetermined temperature and equal to or greater than the second predetermined temperature and an unexecuted degree, that is a degree to which the catalyst degradation suppression control is not executed even though there is a request to execute the catalyst degradation suppression control, is equal to or greater than a predetermined degree set beforehand.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

The invention is also applicable to the manufacturing industry of hybrid vehicles, and the like.

The invention claimed is:

1. A hybrid vehicle provided with an internal combustion engine that has an exhaust gas control apparatus with an exhaust gas control catalyst that purifies exhaust gas provided in an exhaust system, and that is capable of outputting power for running, an electric motor capable of inputting and outputting power for running, and a secondary battery capable of sending and receiving electric power to and from the electric motor, comprising:
a controller that executes catalyst degradation suppression control that controls the internal combustion engine to operate with fuel injection being performed and executes regenerative driving control that controls the electric motor to be regeneratively driven, when a temperature of the exhaust gas control catalyst is equal to or greater than a first predetermined temperature set as a lower limit of a temperature range within which it is assumed that degeneration of the exhaust gas control catalyst will be promoted, as well as when the temperature of the exhaust gas control catalyst is less than the first predetermined temperature and equal to or greater than a second predetermined temperature set as a temperature that is lower than the first predetermined temperature and a power storage percentage that is a percentage of an amount of electric power stored in the secondary battery out of a total capacity of the secondary battery is equal to or greater than a predetermined power storage percentage set beforehand, when there is a predetermined braking request in which there is a braking request while the hybrid vehicle is running with the internal combustion engine operating.

2. The hybrid vehicle according to claim 1, wherein the controller executes the catalyst degradation suppression control for the internal combustion engine and executes the regenerative driving control for the electric motor, when the power storage percentage of the secondary battery is equal to or greater than the predetermined power storage percentage and the secondary battery is charging, when the temperature of the exhaust gas control catalyst is less than the first predetermined temperature and equal to or greater than the second predetermined temperature.

3. The hybrid vehicle according to claim 1, wherein the controller determines that there is a real request to execute the catalyst degradation suppression control when the temperature of the exhaust gas control catalyst is equal to or greater than the first predetermined temperature and determines that there is a temporary request to execute the catalyst degradation suppression control when the temperature of the exhaust gas control catalyst is less than the first predetermined temperature and equal to or greater than the second predetermined temperature, and executes the catalyst degradation suppression control for the internal combustion engine and executes the regenerative driving control for the electric motor, when there is a real request to execute the catalyst degradation suppression control, as well as when there is a temporary request to execute the catalyst degradation suppression control and the power storage percentage of the secondary battery is equal to or greater than the predetermined power storage percentage.

4. The hybrid vehicle according to claim 1, wherein the controller executes the catalyst degradation suppression control for the internal combustion engine and executes the regenerative driving control for the electric motor, irrespective of the power storage percentage of the secondary battery, when a current running state is a temperature increasing running state set as a running state in which the temperature of the exhaust gas control catalyst tends to increase to equal to or greater than the first predetermined temperature, when the temperature of the exhaust gas control catalyst is less than the first predetermined temperature and equal to or greater than the second predetermined temperature.

5. The hybrid vehicle according to claim 4, wherein the temperature increasing running state is a running state in which a vehicle speed is equal to or greater than a predetermined vehicle speed set beforehand and a cumulative air amount that is a cumulative value of an air amount supplied to the internal combustion engine is equal to or greater than a predetermined air amount set beforehand.

6. The hybrid vehicle according to claim 1, wherein the controller determines that there is a request to execute the catalyst degradation suppression control when the temperature of the exhaust gas control catalyst is equal to or greater than the second predetermined temperature, and executes the catalyst degradation suppression control for the internal combustion engine and executes the regenerative driving control for the electric motor, irrespective of the power storage percentage of the secondary battery, when an unexecuted degree, that is a degree to which the catalyst degradation suppression control is not executed even though there is a request to execute the catalyst degradation suppression control, is equal to or greater than a predetermined degree set beforehand, when the temperature of the exhaust gas control catalyst is less than the first predetermined temperature and equal to or greater than the second predetermined temperature.

7. The hybrid vehicle according to claim 6, wherein the unexecuted degree is at least one of a period of time, a percentage, and a number of times that the catalyst degradation suppression control is not executed even though there is a request to execute the catalyst degradation suppression control.

8. A hybrid vehicle provided with an internal combustion engine that has an exhaust gas control apparatus with an exhaust gas control catalyst that purifies exhaust gas provided in an exhaust system, and that is capable of outputting power for running, an electric motor capable of inputting and outputting power for running, and a secondary battery capable of sending and receiving electric power to and from the electric motor, comprising:
a controller that preferentially executes catalyst degradation suppression control that controls the internal combustion engine to operate with fuel injection being performed over catalytic smell suppression control that controls the internal combustion engine such that fuel injection is stopped and executes regenerative driving control that controls the electric motor to be regeneratively driven, when a temperature of the exhaust gas control catalyst is equal to or greater than a first predetermined temperature set as a lower limit of a temperature range within which it is assumed that degradation of the exhaust gas control catalyst will be promoted, as well as when the temperature of the exhaust gas control catalyst is less than the first predetermined temperature and equal to or greater than a second predetermined temperature set as a temperature that is lower than the first predetermined temperature and a power storage percentage that is a percentage of an amount of electric power stored in the secondary battery out of a total capacity of the secondary battery is equal to or greater than a predetermined power storage percentage set beforehand, when there is a predetermined braking request in which there is a braking request while the hybrid vehicle is running with the internal combustion engine operating.

9. The hybrid vehicle according to claim 8, wherein the controller executes the catalyst degradation suppression control for the internal combustion engine and executes the regenerative driving control for the electric motor, when the power storage percentage of the secondary battery is equal to or greater than the predetermined power storage percentage, when the temperature of the exhaust gas control catalyst is equal to or greater than the first predetermined temperature, as well as when the temperature of the exhaust gas control catalyst is less than the first predetermined temperature and equal to or greater than the second predetermined temperature and a catalyst smell producing condition in which it is assumed that a catalytic smell of the exhaust gas control catalyst will be produced is satisfied.

10. The hybrid vehicle according to claim 8, wherein the catalytic smell suppression control is a control that controls the internal combustion engine such that fuel injection is stopped and air supplied to the internal combustion engine is increased.

11. The hybrid vehicle according to claim 8, further comprising:
a second electric motor that is capable of sending and receiving electric power to and from the secondary battery and outputs torque for adjusting a speed of the internal combustion engine, wherein the controller controls the second electric motor to adjust the speed of the internal combustion engine when executing the catalyst degradation suppression control for the internal combustion engine, and does not execute the catalyst degradation suppression control for the internal combustion engine and controls the second electric motor such that torque is not output, when the secondary battery is fully charged.

12. A hybrid vehicle provided with an internal combustion engine that has an exhaust gas control apparatus with an exhaust gas control catalyst that purifies exhaust gas provided in an exhaust system, and that is capable of outputting power for running, an electric motor capable of inputting and outputting power for running, and a secondary battery capable of sending and receiving electric power to and from the electric motor, comprising:
a controller that executes catalyst degradation suppression control that controls the internal combustion engine to operate with fuel injection being performed and executes regenerative driving control that controls the electric motor to be regeneratively driven, when a temperature of the exhaust gas control catalyst is equal to or greater than a first predetermined temperature set as a lower limit of a temperature range within which it is assumed that degeneration of the exhaust gas control catalyst will be promoted, as well as when the temperature of the exhaust gas control catalyst is less than the first predetermined temperature and equal to or greater than a second predetermined temperature set as a temperature that is lower than the first predetermined temperature and a current running state is a temperature increasing running state set as a running state in which the temperature of the exhaust gas control catalyst tends to increase to equal to or greater than the first predetermined temperature, when there is a predetermined braking request in which there is a braking request while the hybrid vehicle is running with the internal combustion engine operating.

13. The hybrid vehicle according to claim 12, wherein the controller determines that there is a request to execute the catalyst degradation suppression control when the temperature of the exhaust gas control catalyst is equal to or greater than the predetermined second temperature, and executes the catalyst degradation suppression control for the internal combustion engine and executes the regenerative driving control for the electric motor, irrespective of the current running state, when an unexecuted degree, that is a degree to which the catalyst degradation suppression control is not executed even though there is a request to execute the catalyst degradation suppression control, is equal to or greater than a predetermined degree set beforehand, when the temperature of the exhaust gas control catalyst is less than the first predetermined temperature and equal to or greater than the second predetermined temperature.

14. The hybrid vehicle according to claim 1, further comprising:
a second electric motor that is capable of sending and receiving electric power to and from the secondary battery and outputs torque for adjusting a speed of the internal combustion engine, wherein the controller controls the second electric motor to adjust the speed of the internal combustion engine when executing the catalyst degradation suppression control for the internal combustion engine, and does not execute the catalyst degradation suppression control for the internal combustion engine and controls the second electric motor such that torque is not output, when the secondary battery is fully charged.

15. The hybrid vehicle according to claim 12, further comprising:
a second electric motor that is capable of sending and receiving electric power to and from the secondary battery and outputs torque for adjusting a speed of the internal combustion engine, wherein the controller controls the second electric motor to adjust the speed of the internal combustion engine when executing the catalyst degradation suppression control for the internal combustion engine, and does not execute the catalyst degradation suppression control for the internal combustion engine and controls the second electric motor such that torque is not output, when the secondary battery is fully charged.

16. A hybrid vehicle provided with an internal combustion engine that has an exhaust gas control apparatus with an exhaust gas control catalyst that purifies exhaust gas provided in an exhaust system, and that is capable of outputting power for running, an electric motor capable of inputting and outputting power for running, and a secondary battery capable of sending and receiving electric power to and from the electric motor, comprising:
a controller that preferentially executes catalyst degradation suppression control that controls the internal combustion engine to operate with fuel injection being performed over catalytic smell suppression control that controls the internal combustion engine such that fuel injection is stopped and executes regenerative driving control that controls the electric motor to be regeneratively driven, when a temperature of the exhaust gas control catalyst is equal to or greater than a first predetermined temperature set as a lower limit of a temperature range within which it is assumed that degradation of the exhaust gas control catalyst will be promoted, as well as when the temperature of the exhaust gas control catalyst is less than the first predetermined temperature and equal to or greater than a second predetermined temperature set as a temperature that is lower than the first predetermined temperature and a current running state is a temperature increasing running state set as a running state in which the temperature of the exhaust gas control catalyst tends to increase to equal to or greater than the first predetermined temperature, when there is a predetermined braking request in which there is a braking request while the hybrid vehicle is running with the internal combustion engine operating.

17. The hybrid vehicle according to claim 16, wherein the controller executes the catalyst degradation suppression control for the internal combustion engine and executes the regenerative driving control for the electric motor, when the current running state is the temperature increasing running state, when the temperature of the exhaust gas control catalyst is equal to or greater than the first predetermined temperature, as well as when the temperature of the exhaust gas control catalyst is less than the first predetermined temperature and equal to or greater than the second predetermined temperature and a catalyst smell producing condition in which it is assumed that a catalytic smell of the exhaust gas control catalyst will be produced is satisfied.

18. The hybrid vehicle according to claim 16, further comprising:
a second electric motor that is capable of sending and receiving electric power to and from the secondary battery and outputs torque for adjusting a speed of the internal combustion engine, wherein the controller controls the second electric motor to adjust the speed of the internal combustion engine when executing the catalyst degradation suppression control for the internal combustion engine, and does not execute the catalyst degradation suppression control for the internal combustion engine and controls the second electric motor such that torque is not output, when the secondary battery is fully charged.

19. A hybrid vehicle provided with an internal combustion engine that has an exhaust gas control apparatus with an exhaust gas control catalyst that purifies exhaust gas provided in an exhaust system, and that is capable of outputting power for running, an electric motor capable of inputting and outputting power for running, and a secondary battery capable of sending and receiving electric power to and from the electric motor, comprising:
a controller that determines that there is a request to execute catalyst degradation suppression control that controls the internal combustion engine to operate with fuel injection being performed when the temperature of the exhaust gas control catalyst is equal to or greater than a second predetermined temperature set as a temperature that is lower than a first predetermined temperature set as a lower limit of a temperature range within which it is assumed that degeneration of the exhaust gas control catalyst will be promoted, when there is a predetermined braking request in which there is a braking request while the hybrid vehicle is running with the internal combustion engine operating, and executes the catalyst degradation suppression control for the internal combustion engine and executes regenerative driving control that controls the electric motor to be regeneratively driven, when the temperature of the exhaust gas control catalyst is equal to or greater than the first predetermined temperature, as well as when the temperature of the exhaust gas control catalyst is less than the first predetermined temperature and equal to or greater than the second predetermined temperature and an unexecuted degree, that is a degree to which the catalyst degradation suppression control is not executed even though there is a request to execute the catalyst degradation suppression control, is equal to or greater than a predetermined degree set beforehand.

20. The hybrid vehicle according to claim 19, further comprising:
a second electric motor that is capable of sending and receiving electric power to and from the secondary battery and outputs torque for adjusting a speed of the internal combustion engine, wherein the controller controls the second electric motor to adjust the speed of the internal combustion engine when executing the catalyst degradation suppression control for the internal combustion engine, and does not execute the catalyst degradation suppression control for the internal combustion engine and controls the second electric motor such that torque is not output, when the secondary battery is fully charged.

21. A hybrid vehicle provided with an internal combustion engine that has an exhaust gas control apparatus with an exhaust gas control catalyst that purifies exhaust gas provided in an exhaust system, and that is capable of outputting power for running, an electric motor capable of inputting and outputting power for running, and a secondary battery capable of sending and receiving electric power to and from the electric motor, comprising:
a controller that determines that there is a request to execute catalyst degradation suppression control that controls the internal combustion engine to operate with fuel injection being performed when the temperature of the exhaust gas control catalyst is equal to or greater than a second predetermined temperature set as a temperature that is lower than a first predetermined temperature set as a lower limit of a temperature range within which it is assumed that degeneration of the exhaust gas control catalyst will be promoted, when there is a predetermined braking request in which there is a braking request while the hybrid vehicle is running with the internal combustion engine operating, and preferentially executes the catalyst degradation suppression control over catalytic smell suppression control that controls the internal combustion engine such that fuel injection is stopped and executes regenerative driving control that controls the electric motor to be regeneratively driven, when the temperature of the exhaust gas control catalyst is equal to or greater than the first predetermined temperature, as well as when the temperature of the exhaust gas control catalyst is less than the first predetermined temperature and equal to or greater than the second predetermined temperature and an unexecuted degree, that is a degree to which the catalyst degradation suppression control is not executed even though there is a request to execute the catalyst degradation suppression control, is equal to or greater than a predetermined degree set beforehand.

22. The hybrid vehicle according to claim 21, wherein the controller executes the catalyst degradation suppression control for the internal combustion engine and executes the regenerative driving control for the electric motor, when the unexecuted degree is equal to or greater than the predetermined degree, when the temperature of the exhaust gas control catalyst is equal to or greater than the first predetermined temperature, as well as when the temperature of the exhaust gas control catalyst is less than the first predetermined temperature and equal to or greater than the second predetermined temperature and a catalyst smell producing condition in which it is assumed that a catalytic smell of the exhaust gas control catalyst will be produced is satisfied.

23. The hybrid vehicle according to claim 21, further comprising:
a second electric motor that is capable of sending and receiving electric power to and from the secondary battery and outputs torque for adjusting a speed of the internal combustion engine, wherein the controller controls the second electric motor to adjust the speed of the internal combustion engine when executing the catalyst degradation suppression control for the internal combustion engine, and does not execute the catalyst degradation suppression control for the internal combustion engine and controls the second electric motor such that torque is not output, when the secondary battery is fully charged.

* * * * *